US012011403B2

(12) United States Patent
Lokken et al.

(10) Patent No.: US 12,011,403 B2
(45) Date of Patent: Jun. 18, 2024

(54) WHEEL LOCK

(71) Applicant: Altimate Medical Holdings, Inc., Morton, MN (US)

(72) Inventors: Michael Warren Lokken, Grove City, MN (US); Wesley Lee Ovre, Redwood Falls, MN (US)

(73) Assignee: ALTIMATE MEDICAL HOLDINGS, INC., Morton, MN (US)

( * ) Notice: Subject to any disclaimer, the term of this patent is extended or adjusted under 35 U.S.C. 154(b) by 616 days.

(21) Appl. No.: 17/194,710

(22) Filed: Mar. 8, 2021

(65) Prior Publication Data

US 2022/0280362 A1 Sep. 8, 2022

(51) Int. Cl.
*A61G 5/10* (2006.01)

(52) U.S. Cl.
CPC ........... *A61G 5/101* (2013.01); *A61G 5/1018* (2013.01); *A61G 5/1035* (2013.01); *A61G 5/1037* (2013.01)

(58) Field of Classification Search
CPC .. A61G 5/1013; A61G 5/1037; A61G 5/1035; A61G 5/1018; A61G 5/101
See application file for complete search history.

(56) References Cited

U.S. PATENT DOCUMENTS 4,570,756 A 2/1986 Minnebraker et al.
4,887,830 A 12/1989 Fought et al.
5,346,039 A 9/1994 Pfisterer
5,355,977 A 10/1994 Kueschall
5,472,066 A 12/1995 Schillo et al.
6,520,526 B2 * 2/2003 Amirola .................. B60T 7/104 188/2 F (Continued)

FOREIGN PATENT DOCUMENTS

CN 203341958 U * 12/2013
CN 109009726 A * 12/2018
CN 111467142 A 7/2020

OTHER PUBLICATIONS

Partial Search Report and Invitation to Pay Additional Fees for International Application No. PCT/US2022/018882, dated Jun. 21, 2022, 13 pg.

*Primary Examiner* — Melanie Torres Williams
(74) *Attorney, Agent, or Firm* — Fredrikson & Byron, P.A.

(57) ABSTRACT

A wheel lock device includes a base, a first arm, and a second arm. A base/first-arm mating portion includes a base/first-arm mating portion cross-sectional profile that changes along a length of the base/first-arm mating portion. A base/second-arm mating portion includes a base/second-arm mating portion cross-sectional profile that changes along a length of the base/second-arm mating portion. The first arm includes a first-arm/base mating portion that includes a first-arm/base mating portion cross-sectional profile that changes along a length of the first-arm/base mating portion in a direction toward the first-arm first aperture in a manner complementary to the base/first-arm mating portion cross-sectional profile. The second arm includes a second-arm/base mating portion that includes a second-arm/base mating portion cross-sectional profile that changes along a length of the second-arm/base mating portion in a direction toward the second-arm first aperture in a manner complementary to the base/second-arm mating portion cross-sectional profile.

22 Claims, 10 Drawing Sheets

(56) References Cited

U.S. PATENT DOCUMENTS

| | | | |
|---|---|---|---|
| 6,929,100 | B2 | 8/2005 | Tanksley et al. |
| 7,380,642 | B2 | 6/2008 | Muller |
| 10,245,193 | B2 | 4/2019 | Gingras et al. |
| 2007/0119662 | A1 | 5/2007 | Muller |

* cited by examiner

WHEEL LOCK

TECHNICAL FIELD

This disclosure relates generally to wheel lock devices and related systems and methods. Wheel lock device embodiments disclosed herein can be configured to couple to a wheeled device, such as a wheelchair, and be selectively engaged with a wheel of the wheeled device to lock such wheel and, thereby, prevent unwanted movement of the wheeled device.

BACKGROUND

Various wheeled devices are commonly used to provide mobility. Some such wheeled devices are designed to provide mobility to a person. Examples of such wheeled devices include wheelchairs and strollers. These wheeled devices can be selectively moved from one location to another to provide the intended mobility.

To prevent unwanted movement, wheeled devices can include a locking mechanism that acts to prevent a wheel from unintended rotational movement. However, such a locking mechanism can be subjected to a variety of different forces. Such forces act to induce wear on components of the locking mechanism and can lead to failure of the locking mechanism over time. Moreover, to be effective, a locking mechanism needs to sufficiently engage a wheel of the wheeled device. Yet, at the same time, the locking mechanism also needs to be positioned so that a user of the wheeled device can access it, when desired, to prevent unintended rotational movement of the wheeled device.

SUMMARY

This disclosure in general provides embodiments relating to wheel lock devices and related systems and methods.

Certain wheel lock device embodiments disclosed herein can include one or more features, such as complementary component mating portions, configured to efficiently withstand forces imparted on the wheel lock device during use and, thereby, increase the longevity of the wheel lock device. This, in turn, can lead to cost savings associated with the wheel lock device over its useful life. As one example, some wheel lock device embodiments disclosed herein can include component mating portions having complementary cross-sectional profiles at mating interfaces so as to configure such components to mate together and efficiently transfer, from one mated component to the other, one or more forces experienced during use of the wheel lock device. In some such examples, the component mating portions having complementary cross-sectional profiles that can act to reduce wear on a fastener extending through these components and, thereby, increase the useful life of the fastener. In one example, the complementary cross-sectional profiles of the component mating portions can be configured to allow the fastener to extend through respective apertures of the mated components without the fastener contacting one or more interior surfaces defining such apertures. This can be especially useful in various wheel lock devices where the fastener is often be the first component to wear out.

In addition, certain wheel lock device embodiments disclosed herein can include one or more features configured to improve the fitting between the wheel lock device and the wheeled device for which the wheel lock device is intended to selectively prevent unwanted movement. As one example, some wheel lock device embodiments disclosed herein can include one or more features configured to allow a component of the wheel lock device, such as a foot configured to selective engage a wheel of a wheeled device, to be locationally adjusted as appropriate for a particular wheeled device. As another example, some wheel lock device embodiments disclosed herein can include one or more components that are removable and interchangeable. For instance, some wheel lock device embodiments disclosed herein can include a handle that is removable from the wheel lock device so that another handle (e.g., having one or more different geometric features), better suited for the particular application of the wheel lock device, can be used in its place.

One wheel lock device embodiment includes a mounting clamp, a base, a first arm, a second arm, a first fastener, a second fastener, a foot, and an actuator. The mounting clamp is configured to couple to a wheeled device. The base extends from the mounting clamp and defines a base first aperture and a base second aperture. The base includes a base/first-arm mating portion and a base/second-arm mating portion. The base/first-arm mating portion extends from a base surface to the base first aperture and includes a base/first-arm mating portion cross-sectional profile that changes along a length of the base/first-arm mating portion in a direction toward the base first aperture. The base/second-arm mating portion extends from the base surface to the base second aperture and includes a base/second-arm mating portion cross-sectional profile that changes along a length of the base/second-arm mating portion in a direction toward the base second aperture. The first arm is supported by the base and defines a first-arm first aperture. The first arm includes a first-arm/base mating portion that extends from a base-side surface of the first arm to the first-arm first aperture. The first-arm/base mating portion includes a first-arm/base mating portion cross-sectional profile that changes along a length of the first-arm/base mating portion in a direction toward the first-arm first aperture in a manner complementary to the base/first-arm mating portion cross-sectional profile such that the first-arm/base mating portion mates with the base/first-arm mating portion. The second arm is supported by the base and defines a second-arm first aperture. The second arm includes a second-arm/base mating portion that extends from a base-side surface of the second arm to the second-arm first aperture. The second-arm/base mating portion includes a second-arm/base mating portion cross-sectional profile that changes along a length of the second-arm/base mating portion in a direction toward the second-arm first aperture in a manner complementary to the base/second-arm mating portion cross-sectional profile such that the second-arm/base mating portion mates with the base/second-arm mating portion. The first fastener extends through the base first aperture, the base/first-arm mating portion, the first-arm/base mating portion, and the first-arm first aperture. The second fastener extends through the base second aperture, the base/second-arm mating portion, the second-arm/base mating portion, and the second-arm first aperture. The foot is coupled to the first arm. The actuator is coupled to the second arm. The actuator is configured to move between an engaged position in which the foot is configured to engage a wheel of the wheeled device and a disengaged position in which the foot is configured to disengage the wheel of the wheeled device.

In some further embodiments of the above wheel lock device embodiment, a first interior surface of the first arm defines the first-arm first aperture. The first fastener extends through the first-arm/base mating portion and the first-arm first aperture such that a first space is defined between the first fastener and the first interior surface of the first arm.

In some further embodiments of the above wheel lock device embodiment, the first-arm/base mating portion cross-sectional profile decreases along the length of the first-arm/base mating portion in the direction toward the first-arm first aperture. And, the base/first-arm mating portion cross-sectional profile decreases along the length of the base/first-arm mating portion in the direction toward the base first aperture.

Another wheel lock device embodiment includes a mounting clamp, a base, a first arm, a second arm, a first fastener, a second fastener, a foot, and an actuator. The mounting clamp is configured to couple to a wheeled device. The base extends from the mounting clamp. Each of the first arm and the second arm is supported by the base, and the base couples the first arm to the second arm. The first arm defines a first receptacle and a second receptacle spaced along the first arm from the first receptacle. The first fastener extends between the base and the first arm, and the second fastener extends between the base and the second arm. The foot is coupled to the first arm at the first receptacle. The second receptacle is configured to receive the foot to allow a location of the foot on the first arm to be selectively moved from the first receptacle to the second receptacle. The actuator is coupled to the second arm. The actuator is configured to move between an engaged position, in which the foot is configured to engage a wheel of the wheeled device, and a disengaged position, in which the foot is configured to disengage the wheel of the wheeled device.

A further wheel lock device embodiment includes a mounting clamp, a base, a first arm, a second arm, a first fastener, a second fastener, a foot, and a handle. The mounting clamp is configured to couple to a wheeled device. The base extends from the mounting clamp. Each of the first arm and the second arm is supported by the base, and the base couples the first arm to the second arm. The first fastener extends between the base and the first arm, and the second fastener extends between the base and the second arm. The foot is coupled to the first arm. The handle is coupled to the second arm. The handle is removable from the second arm while keeping the second arm coupled to the first arm via the base. The handle is configured to move between an engaged position, in which the foot is configured to engage a wheel of the wheeled device, and a disengaged position, in which the foot is configured to disengage the wheel of the wheeled device.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular examples of the present invention and, therefore, do not limit the scope of the invention. The drawings are not necessarily to scale and are intended for use in conjunction with the explanations in the following detailed description. Examples of the present invention will hereinafter be described in conjunction with the appended drawings.

FIG. 3 shows an arm-side surface of the first linkage element.

FIG. 5 shows an arm-side surface of the second linkage element.

FIG. 6 shows a first-linkage-element-side surface of the first arm and a first-linkage-element-side surface of the second arm.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Figure 1:
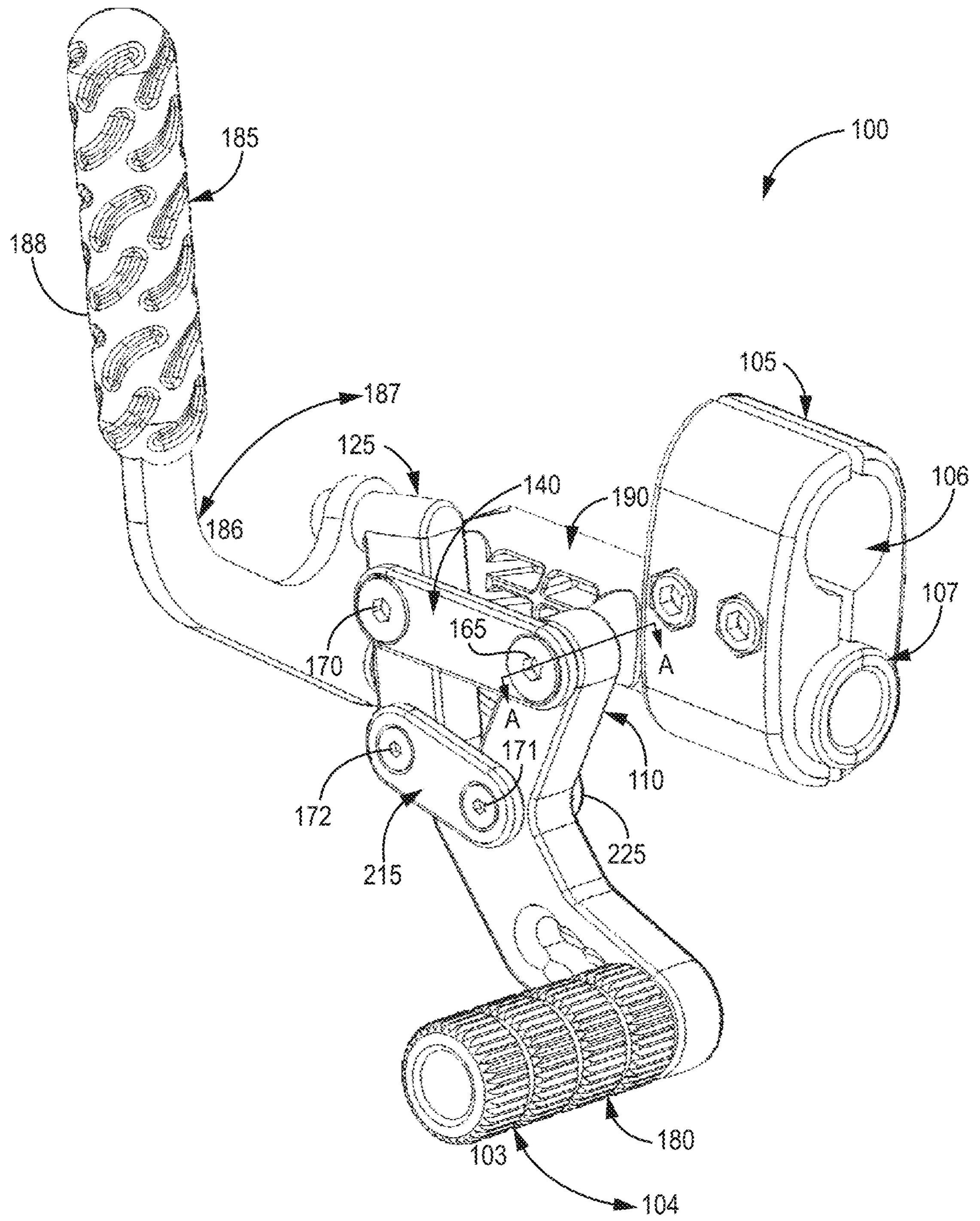
FIG. 1 is a perspective view of an embodiment of a wheel lock device.
Figure 2:
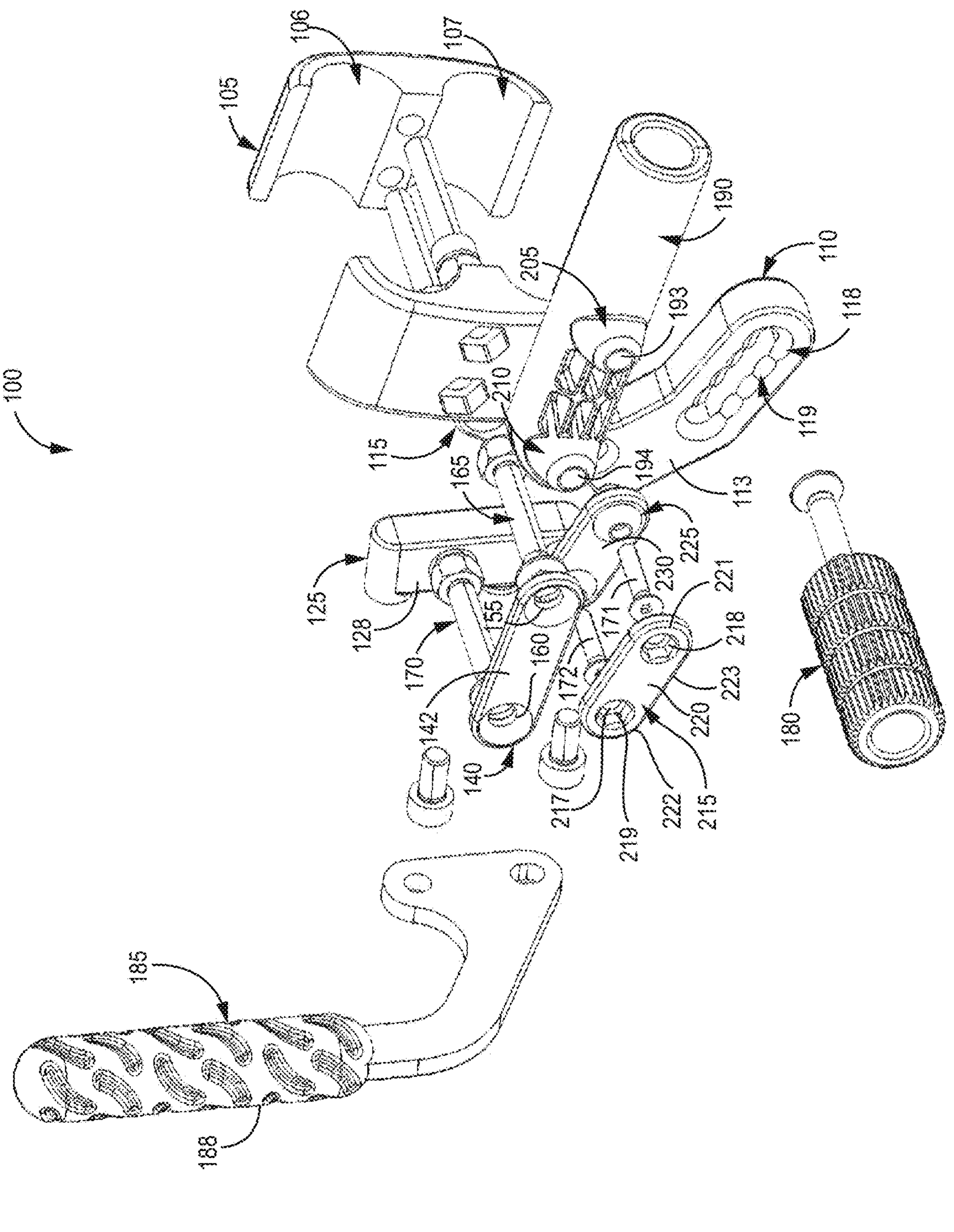
FIG. 2 is an exploded, perspective view of the wheel lock device of FIG. 1.

FIGS. 1 and 2 illustrate an embodiment of a wheel lock device 100. FIG. 1 shows a perspective view of the wheel lock device 100, and FIG. 2 shows an exploded perspective view of the wheel lock device 100.

The wheel lock device 100 can be used, for instance, with a wheeled device so as to selectively lock a wheel of the wheeled device and, thereby, prevent unwanted movement of the wheeled device. Examples of wheeled devices with which the wheel lock device 100 can be configured to be used include wheelchairs, strollers, wheeled machines/equipment, and so on. In some examples, the wheeled device can comprise rotating machinery in which it is useful or necessary to be able to lock a rotating element to prevent its turning. Though the wheel lock device 100 can also be configured to be used with various other types of wheeled devices, including those designed to transport one or more people as well as those designed to transport one or more tangible goods.

The wheel lock device 100 can include a mounting clamp 105, a foot 180, and an actuator 185. The mounting clamp 105 can be configured to couple to a wheeled device, and the actuator 185 can be configured to cause the foot 180 to selectively engage a wheel of the wheeled device. For example, the actuator 185 can be configured to move between an engaged position 187, in which the foot 180 is configured to engage a wheel of the wheeled device, and a disengaged position 186, in which the foot 180 is configured to disengage the wheel of the wheeled device. As shown in the example of FIG. 1, when the actuator 185 is in the engaged position 187, the foot 180 can be in a wheel engaging position 103. And, when the actuator 185 is in the disengaged position 186, the foot 180 can be in a wheel disengaging position 104. Thus, the actuator 185 is configured such that moving the actuator 185 between the engaged and disengaged positions 187, 186 causes the foot 180 to move between the wheel engaging and wheel disengaging positions 103, 104, respectively.

The mounting clamp 105 can define a first clamp opening 106 and a second clamp opening 107. The second clamp opening 107 is spaced from the first clamp opening 106, for instance such that the first and second clamp openings 106, 107 extend parallel to one another through a body of the mounting clamp 105. The first clamp opening 106 can be configured to couple to the wheeled device, and the second clamp opening 107 can be configured to receive a base 190 of the wheel lock device 100. In various embodiments, the first and second clamp openings 106, 107 can be configured to facilitate coupling of the mounting clamp 105 to different types of wheeled devices. For example, a cross-sectional area of the first clamp opening 106 can be adjustable so as to facilitate a secure coupling to an appropriate structure of the wheeled device. As another example, the first clamp opening 106 can be configured to be translated relative to a structure of the wheeled device to which it is to be coupled (e.g., before fully coupling the mounting clamp 105 to the wheeled device via the first clamp opening 106) so as to adjust the positioning of the wheel lock device 100 relative to the wheeled device. As a further example, the first clamp opening 106 can be configured to be rotated relative to a structure of the wheeled device to which it is to be coupled (e.g., before fully coupling the mounting clamp 105 to the wheeled device via the first clamp opening 106) so as to adjust the positioning of the wheel lock device 100 relative to the wheeled device.

The wheel lock device 100 also includes the base 190, a first arm 110, and a second arm 125. The base 190 can extend from the mounting clamp 105. The base 190 can define a base first aperture 193 and a base second aperture 194. Each of the first arm 110 and the second arm 125 can be supported by the base 190 and, more specifically, each of the first arm 110 and the second arm 125 can be mated to the base 190. To facilitate this mating, in the illustrated embodiment, the base 190 includes a base/first-arm mating portion 205, configured to mate with the first arm 110, and a base/second-arm mating portion 210, configured to mate with the second arm 125.

The foot 180 can be coupled to the first arm 110. As shown in FIGS. 1 and 2, the first arm 110 can define a first receptacle 118 and a second receptacle 119. The second receptacle 119 can be spaced along the first arm 110 from the first receptacle 118. In the illustrated embodiment, the first arm 110 further includes additional receptacles spaced along the first arm 110 from each of the first receptacle 118 and the second receptacle 119. Theses receptacles, including the first and second receptacles 118, 119, can allow the location of the foot 180 to be selectively adjusted, for instance to improve the positioning of the foot 180 relative to a wheel of the wheeled device so as to better optimize the wheel locking function of the foot 180 for a particular wheeled device. To do so, the foot 180 can be selectively uncoupled from one receptacle and then coupled to another receptacle spaced apart at a different location on the first arm 110. For example, the foot 180 can be coupled to the first arm 110 at the first receptacle 118, and the second receptacle 119 can be configured to receive the foot 180 when the foot 180 is removed from the first receptacle 118 to allow a location of the foot 180 on the first arm 110 to be selectively moved from the first receptacle 118 to the second receptacle 119.

The actuator 185 can be coupled to the second arm 125. In the illustrated embodiment, the actuator 185 includes a handle 188. The handle 188 can be removable from the second arm 125, for instance while keeping the second arm 125 coupled to the first arm 110 via the base 190 and/or the base/second-arm mating portion 210 mated with the second arm 125 (e.g., while keeping the base/second-arm mating portion 210 mated with the second-arm/base mating portion 200). This can allow the handle 188 to be switched out from the wheel lock device 100 and replaced, at the second arm 125, with another handle that is better suited for use with a particular type of wheeled device.

The wheel lock device 100 can also include one or more linkage elements and one or more fasteners. In the illustrated embodiment, the wheel lock device 100 include a first linkage element 140, a second linkage element 225, and a third linkage element 215. Each of the first linkage element 140, the second linkage element 225, and the third linkage element 215 can couple the first arm 110 to the second arm 125. Also in the illustrated embodiment, the wheel lock device includes a first fastener 165, a second fastener 170, a third fastener 171, and a fourth fastener 172. The first fastener 165 can secure together the first linkage element 140, the first arm 110, and the base 190, for instance by extending from the first linkage element 140, through the first arm 110, and to the base 190. The second fastener 170 can secure together the first linkage element 140, the second arm 125, and the base 190, for instance by extending from the first linkage element 140, through the second arm 125, and to the base 190. The third fastener 171 can secure together the third linkage element 215, the first arm 110, and the second linkage element 225, for instance by extending from the third linkage element 215, through the first arm 110, and to the second linkage element 225. And, the fourth fastener 172 can secure together the third linkage element 215, the second arm 125, and the second linkage element 225, for instance by extending from the third linkage element 215, through the second arm 125, and to the second linkage element 225.

Figure 3:
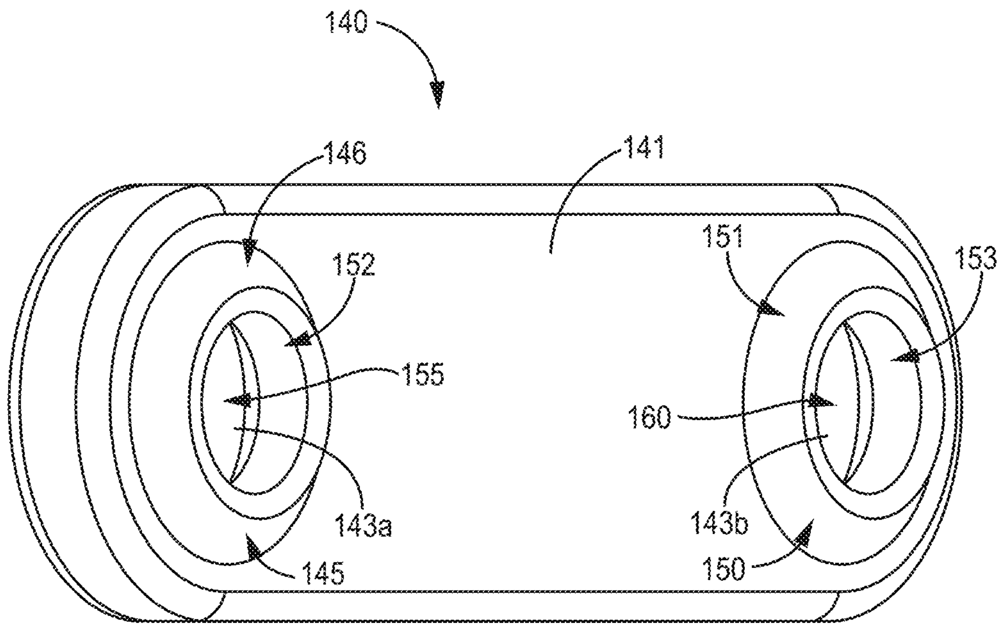
FIG. 3 is a perspective view of an embodiment of a first linkage element of the wheel lock device of FIG. 1.
Figure 4:
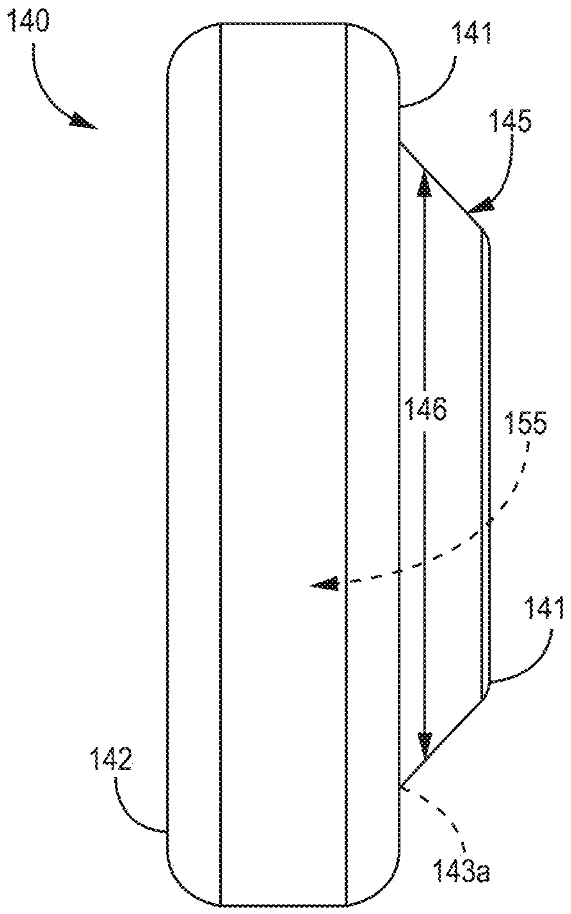
FIG. 4 is a side elevational view of the first linkage element of FIG. 3.

FIGS. 3 and 4 illustrate a perspective view of the first linkage element 140 of the wheel lock device 100. FIG. 3 shows an arm-side surface 141 of the first linkage element 140 facing the first arm 110 and the second arm 125. The arm-side surface 141 of the first linkage element 140 is opposite an exterior surface 142 of the first linkage element 140. FIG. 4 shows a side elevational view of the first linkage element 140.

The first linkage element 140 can define a first-linkage-element first aperture 155 and a first-linkage-element second aperture 160. In particular, the first linkage element 140 can include a first interior surface **143*a* that defines the first-linkage-element first aperture 155, and the first linkage element 140 can include a second interior surface 143*b* that defines the first-linkage-element second aperture 160. Each of the first-linkage-element first aperture 155 and the first-linkage-element second aperture 160 can extend through the first linkage element 140 from the arm-side surface 141 to the exterior surface 142. And, each of the first-linkage-element first aperture 155 and the first-linkage-element second aperture 160 can be configured to receive a fastener therethrough, for instance as will be illustrated and described further herein. Namely, the first fastener 165 can extend through the first-linkage-element first aperture 155, and the second fastener 170 can extend through the first-linkage-element second aperture 160**.

In the illustrated embodiment of the wheel lock device 100, the first linkage element 140 couples the first arm 110 to the second arm 125. To do so, the first linkage element 140 includes a first-linkage-element/first-arm mating portion 145 for coupling to a complementary mating portion at the first arm 110 and a first-linkage-element/second-arm mating portion 150 for coupling to a complementary mating portion at the second arm 125.

The first-linkage-element/first-arm mating portion 145 extends from the arm-side surface 141 of the first linkage element 140 to the first-linkage-element first aperture 155. Thus, as shown here, the first-linkage-element/first-arm mating portion 145 can begin where one end of the first-linkage-element first aperture 155 terminates such that the first-linkage-element/first-arm mating portion 145 forms therein a continuation aperture 152 from the end of the first-linkage-element first aperture 155 to an end of the first-linkage-element/first-arm mating portion 145 forming an outermost portion of the arm-side surface 141. The first-linkage-element/first-arm mating portion 145 includes a first-linkage-element/first-arm mating portion cross-sectional profile 146. As shown here, the first-linkage-element/first-arm mating portion cross-sectional profile 146 changes along a length of the first-linkage-element/first-arm mating portion 145 in a direction toward the first-linkage-element first aperture 155 in a manner complementary to a first-arm/first-linkage-element mating portion cross-sectional profile of a first-arm/first-linkage-element mating portion of the first arm 110. In this way, these complementary mating portions allow the first-linkage-element/first-arm mating portion 145 to mate with the first-arm/first-linkage-element mating portion of the first arm 110.

Likewise, the first-linkage-element/second-arm mating portion 150 extends from the arm-side surface 141 of the first linkage element 140 to the first-linkage-element second aperture 160. Thus, as shown here, the first-linkage-element/second-arm mating portion 150 can begin where one end of the first-linkage-element second aperture 160 terminates such that the first-linkage-element/second-arm mating portion 150 forms therein a continuation aperture 153 from the end of the first-linkage-element second aperture 160 to an end of the first-linkage-element/second-arm mating portion 150 forming an outermost portion of the arm-side surface 141. The first-linkage-element/second-arm mating portion 150 includes a first-linkage-element/second-arm mating portion cross-sectional profile 151 that changes along a length of the first-linkage-element/second-arm mating portion 150 in a direction toward the first-linkage-element second aperture 160 in a manner complementary to a second-arm/first-linkage-element mating portion cross-sectional profile of a second-arm/first-linkage-element mating portion of the second arm 125. In this way, these complementary mating portions allow the first-linkage-element/second-arm mating portion 150 to mate with the second-arm/first-linkage-element mating portion of the second arm 125.

In the illustrated embodiment, each of the first-linkage-element/first-arm mating portion cross-sectional profile 146 and the first-linkage-element/second-arm mating portion cross-sectional profile 151 decreases in cross-sectional width, along at least a portion of the length thereof, in the direction toward the respective first-linkage-element first aperture 155 and first-linkage-element second aperture 160. For instance, in the example shown here, each of the first-linkage-element/first-arm mating portion cross-sectional profile 146 and the first-linkage-element/second-arm mating portion cross-sectional profile 151 defines a continual decrease in cross-section width, along at least a portion of the length thereof, in the direction toward the respective first-linkage-element first aperture 155 and first-linkage-element second aperture 160. As such, in this example, each of the first-linkage-element/first-arm mating portion cross-sectional profile 146 and the first-linkage-element/second-arm mating portion cross-sectional profile 151 defines a generally conical respective first-linkage-element/first-arm mating portion 145 and first-linkage-element/second-arm mating portion 150. In this example, each of the conical first-linkage-element/first-arm mating portion 145 and first-linkage-element/second-arm mating portion 150 can serve as a male conical mating portion for mating to the respective first arm 110 and second arm 125.

Figure 5:
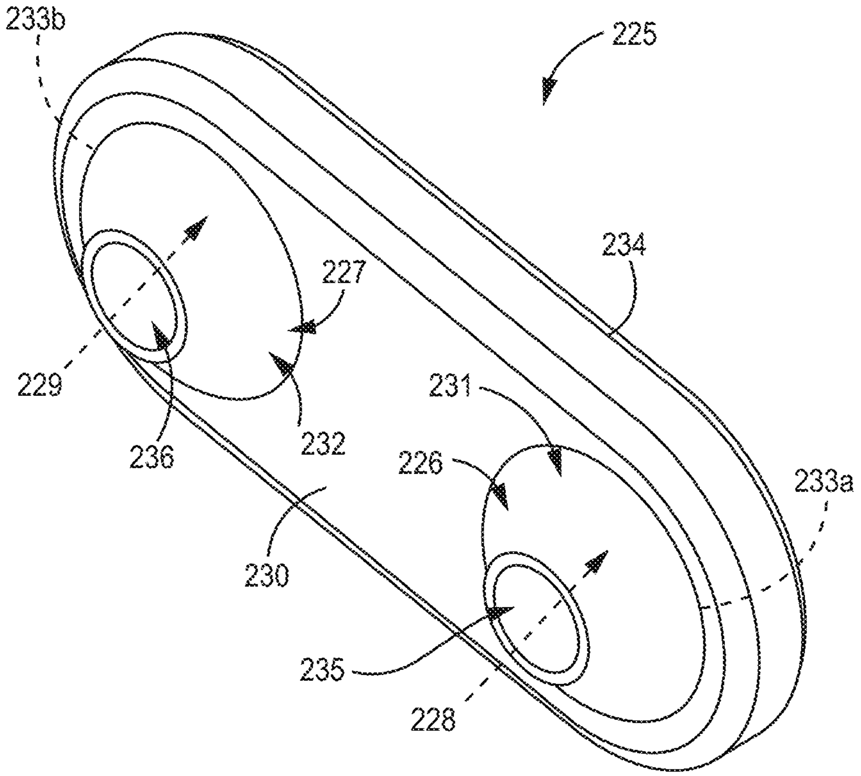
FIG. 5 is a perspective view of an embodiment of a second linkage element of the wheel lock device of FIG. 1.

FIG. 5 illustrates a perspective view of an embodiment of a second linkage element 225 of the wheel lock device 100. FIG. 5 shows an arm-side surface 230 of the second linkage element 225. The arm-side surface 230 of the second linkage element 225 faces the first arm 110 and the second arm 125. The second linkage element 225 can be similar to the first linkage element 140 except that the second linkage element 225 is configured to mate to the first and second arms 110, 125 at an opposite side of the first and second arms 110, 125 than the first linkage element 140.

The second linkage element 225 can define a second-linkage-element first aperture 228 and a second-linkage-element second aperture 229. In particular, the second linkage element 225 can include a first interior surface **233*a* that defines the second-linkage-element first aperture 228, and the second linkage element 225 can include a second interior surface 233*b* that defines the second-linkage-element second aperture 229. Each of the second-linkage-element first aperture 228 and the second-linkage-element second aperture 229 can extend through the second linkage element 225 from the arm-side surface 230 to the exterior surface 234 that is opposite the arm-side surface 230. And, each of the second-linkage-element first aperture 228 and the second-linkage-element second aperture 229 can be configured to receive a fastener therethrough. Namely, the third fastener 171 can extend through the second-linkage-element first aperture 228, and the fourth fastener 172 can extend through the second-linkage-element second aperture 229**.

In the illustrated embodiment of the wheel lock device 100, the second linkage element 225 couples the first arm 110 to the second arm 125. As noted, the second linkage element 225 can couple the first arm 110 to the second arm 125 at a side of the first and second arms 110, 125 opposite the first linkage element 140. To do so, the second linkage element 225 includes a second-linkage-element/first-arm mating portion 226 for coupling to a complementary mating portion at the first arm 110 and a second-linkage-element/second-arm mating portion 227 for coupling to a complementary mating portion at the second arm 125.

The second-linkage-element/first-arm mating portion 226 extends from the arm-side surface 230 of the second linkage element 225 to the second-linkage-element first aperture 228. Thus, as shown here, the second-linkage-element/first-arm mating portion 226 can begin where one end of the second-linkage-element first aperture 228 terminates such that the second-linkage-element/first-arm mating portion 226 forms therein a continuation aperture 235 from the end of the second-linkage-element first aperture 228 to an end of the second-linkage-element/first-arm mating portion 226 forming an outermost position of the arm-side surface 230. The second-linkage-element/first-arm mating portion 226 includes a second-linkage-element/first-arm mating portion cross-sectional profile 231. As shown here, the second-linkage-element/first-arm mating portion cross-sectional profile 231 changes along a length of the second-linkage-element/first-arm mating portion 226 in a direction toward the second-linkage-element first aperture 228 in a manner complementary to a first-arm/second-linkage-element mating portion cross-sectional profile of a first-arm/second-linkage-element mating portion. In this way, these complementary mating portions allow the second-linkage-element/first-arm mating portion 226 to mate with the first-arm/second-linkage-element mating portion.

Likewise, the second-linkage-element/second-arm mating portion 227 extends from the arm-side surface 230 of the second linkage element 225 to the second-linkage-element second aperture 229. Thus, as shown here, the second-linkage-element/second-arm mating portion 227 can begin where one end of the second-linkage-element second aperture 229 terminates such that the second-linkage-element/second-arm mating portion 227 forms therein a continuation aperture 236 from the end of the second-linkage-element second aperture 229 to an end of the second-linkage-element/second-arm mating portion 227 forming an outermost position of the arm-side surface 230. The second-linkage-element/second-arm mating portion 227 includes a second-linkage-element/second-arm mating portion cross-sectional profile 232 that changes along a length of the second-linkage-element/second-arm mating portion 227 in a direction toward the second-linkage-element second aperture 229 in a manner complementary to a second-arm/second-linkage-element mating portion cross-sectional profile of a second-arm/second-linkage-element mating portion of the second arm 125. In this way, these complementary mating portion allow the that the second-linkage-element/second-arm mating portion 227 to mate with the second-arm/second-linkage-element mating portion of the second arm 125.

In the illustrated embodiment, each of the second-linkage-element/first-arm mating portion cross-sectional profile 231 and the second-linkage-element/second-arm mating portion cross-sectional profile 232 decreases in cross-sectional width, along at least a portion of the length thereof, in the direction toward the respective second-linkage-element first aperture 228 and second-linkage-element second aperture 229. For instance, in the example shown here, each of the second-linkage-element/first-arm mating portion cross-sectional profile 231 and the second-linkage-element/second-arm mating portion cross-sectional profile 232 defines a continual decrease in cross-section width, along at least a portion of the length thereof, in the direction toward the respective second-linkage-element first aperture 228 and second-linkage-element second aperture 229. As such, in this example, each of the second-linkage-element/first-arm mating portion cross-sectional profile 231 and the second-linkage-element/second-arm mating portion cross-sectional profile 232 defines a generally conical respective second-linkage-element/first-arm mating portion 226 and second-linkage-element/second-arm mating portion 227. In this example, each of the conical second-linkage-element/first-arm mating portion 226 and second-linkage-element/second-arm mating portion 227 can serve as a male conical mating portion for mating to the respective first arm 110 and second arm 125.

In some embodiments, the wheel lock device 100 can further include the third linkage element 215. The exemplary embodiment of the wheel lock device 100 as shown in FIGS. 1 and 2 includes the third linkage element 215. The third linkage element 215 can couple the first arm 110 to the second arm 125. The third linkage element 215 can be similar to the first linkage element 140. Namely, like the first linkage element 140, the third linkage element 215 is configured to mate to the first and second arms 110, 125 at the same side of the first and second arms 110, 125 as the first linkage element 140. As illustrated, the third linkage element 215 is at the same side of the first and second arms 110, 125 as the first linkage element 140 and spaced apart from the first linkage element 140 at this side (e.g., closer to the foot 180). The third linkage element 215 has an arm-side surface 223 facing the first arm 110 and the second arm 125. The arm-side surface 223 of the third linkage element 215 is opposite an exterior surface 220 of the third linkage element 215.

The third linkage element 215 can define a third-linkage-element first aperture 218 and a third-linkage-element second aperture 219. The third-linkage-element first aperture 218 can be similar to, or the same as, the first-linkage-element first aperture 155 described and illustrated elsewhere herein. The third-linkage-element second aperture 219 can be similar to, or the same as, the first-linkage-element second aperture 160 described and illustrated elsewhere herein. Each of the third-linkage-element first aperture 218 and the third-linkage-element second aperture 219 can extend through the third linkage element 215 from the arm-side surface 223 to the exterior surface 220. And, each of the third-linkage-element first aperture 218 and the third-linkage-element second aperture 219 can be configured to receive a fastener therethrough, for instance as will be illustrated and described further herein. Namely, the third fastener 171 can extend through the third-linkage-element first aperture 218, and the fourth fastener 172 can extend through the third-linkage-element second aperture 219.

As noted, in the illustrated embodiment of the wheel lock device 100, the third linkage element 215 couples the first arm 110 to the second arm 125. To do so, the third linkage element 215 includes a third-linkage-element/first-arm mating portion 216 for coupling to a complementary mating portion at the first arm 110 and a third-linkage-element/second-arm mating portion 217 for coupling to a complementary mating portion at the second arm 125. In some embodiment, the third-linkage-element/first-arm mating portion 216 can be similar to, or the same as, the first-linkage-element/first-arm mating portion 145, and the third-linkage-element/second-arm mating portion 217 can be similar to, or the same as, the first-linkage-element/second-arm mating portion 150.

The third-linkage-element/first-arm mating portion 216 can extend from the arm-side surface 223 of the third linkage element 215 to the third-linkage-element first aperture 218. Thus, the third-linkage-element/first-arm mating portion 216 can begin where one end of the third-linkage-element first aperture 218 terminates such that the third-linkage-element/first-arm mating portion 216 forms therein a continuation aperture (e.g., the same as the continuation aperture 152) from the end of the third-linkage-element first aperture 218 to an end of the third-linkage-element/first-arm mating portion 216 forming an outermost portion of the arm-side surface 223. The third-linkage-element/first-arm mating portion 216 includes a third-linkage-element/first-arm mating portion cross-sectional profile 221. The third-linkage-element/first-arm mating portion cross-sectional profile 221 can be similar to, or the same as, the first-linkage-element/first-arm mating portion cross-sectional profile 146. Namely, the third-linkage-element/first-arm mating portion cross-sectional profile 221 can change along a length of the third-linkage-element/first-arm mating portion 216 in a direction toward the third-linkage-element first aperture 218 in a manner complementary to a first-arm/third-linkage-element mating portion cross-sectional profile of a first-arm/third-linkage-element mating portion of the first arm 110. In this way, these complementary mating portions allow the third-linkage-element/first-arm mating portion 216 to mate with the first-arm/third-linkage-element mating portion of the first arm 110.

Likewise, the third-linkage-element/second-arm mating portion 217 can extend from the arm-side surface 223 of the third linkage element 15 to the third-linkage-element second aperture 219. Thus, the third-linkage-element/second-arm mating portion 217 can begin where one end of the third-linkage-element second aperture 219 terminates such that the third-linkage-element/second-arm mating portion 217 forms therein a continuation aperture (e.g., the same as the continuation aperture 153) from the end of the third-linkage-element second aperture 219 to an end of the third-linkage-element/second-arm mating portion 217 forming an outer-most portion of the arm-side surface 223. The third-linkage-element/second-arm mating portion 217 includes a third-linkage-element/second-arm mating portion cross-sectional profile 222. The third-linkage-element/second-arm mating portion cross-sectional profile 222 can be similar to, or the same as, the first-linkage-element/second-arm mating portion cross-sectional profile 151. Namely, the third-linkage-element/second-arm mating portion cross-sectional profile 222 can change along a length of the third-linkage-element/second-arm mating portion 217 in a direction toward the third-linkage-element second aperture 219 in a manner complementary to a second-arm/third-linkage-element mating portion cross-sectional profile of a second-arm/third-linkage-element mating portion of the second arm 125. In this way, these complementary mating portions allow the third-linkage-element/second-arm mating portion 217 to mate with the second-arm/third-linkage-element mating portion of the second arm 125.

Similar to the first-linkage-element/first-arm mating portion cross-sectional profile 146 and the first-linkage-element/second-arm mating portion cross-sectional profile 151, each of the third-linkage-element/first-arm mating portion cross-sectional profile 221 and the third-linkage-element/second-arm mating portion cross-sectional profile 222 decreases in cross-sectional width, along at least a portion of the length thereof, in the direction toward the respective third-linkage-element first aperture 218 and third-linkage-element second aperture 219. For instance, in the example shown here, each of the third-linkage-element/first-arm mating portion cross-sectional profile 221 and the third-linkage-element/second-arm mating portion cross-sectional profile 222 defines a continual decrease in cross-sectional width, along at least a portion of the length thereof, in the direction toward the respective third-linkage-element first aperture 218 and third-linkage-element second aperture 219. As such, in this example, each of the third-linkage-element/first-arm mating portion cross-sectional profile 221 and the third-linkage-element/second-arm mating portion cross-sectional profile 222 defines a generally conical respective third-linkage-element/first-arm mating portion 216 and third-linkage-element/second-arm mating portion 217. In this example, each of the conical third-linkage-element/first-arm mating portion 216 and third-linkage-element/second-arm mating portion 217 can serve as a male conical mating portion for mating to the respective first arm 110 and second arm 125.

Figure 6:
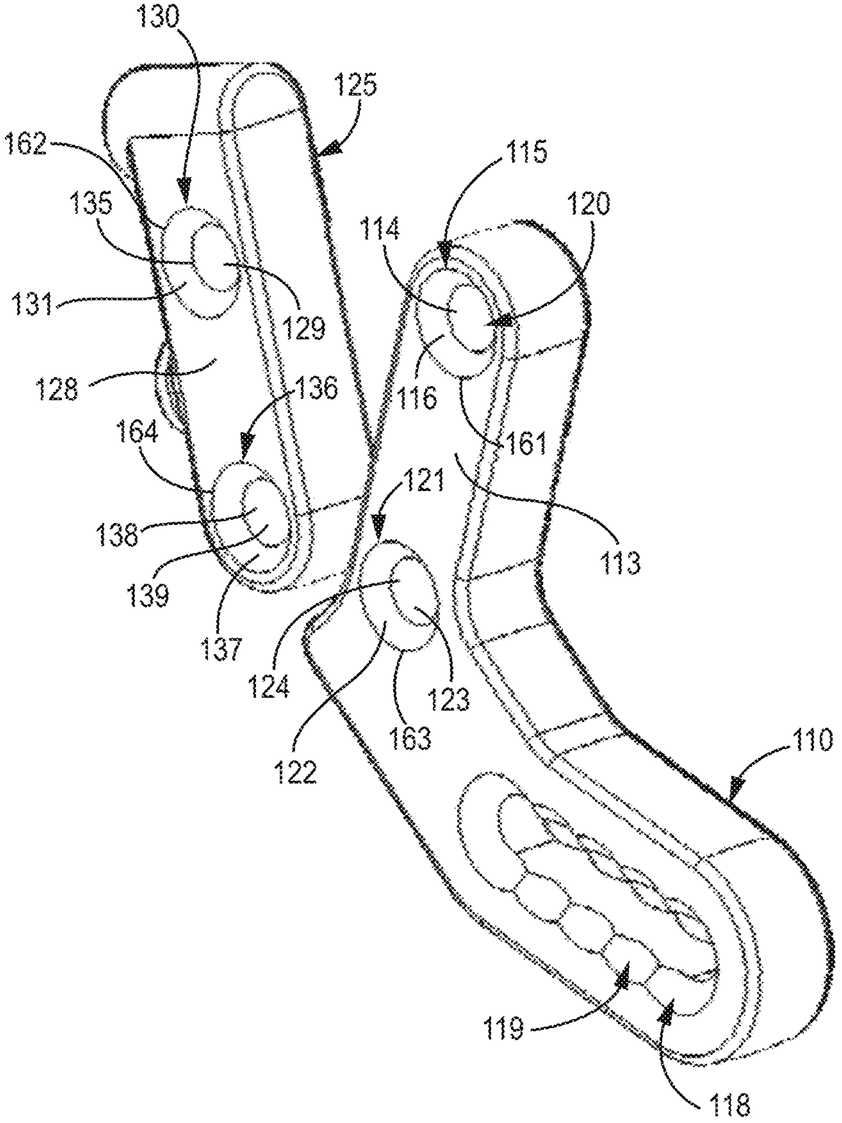
FIG. 6 is a perspective view of an embodiment of a first arm and a second arm of the wheel lock device of FIG. 1.
Figure 7:
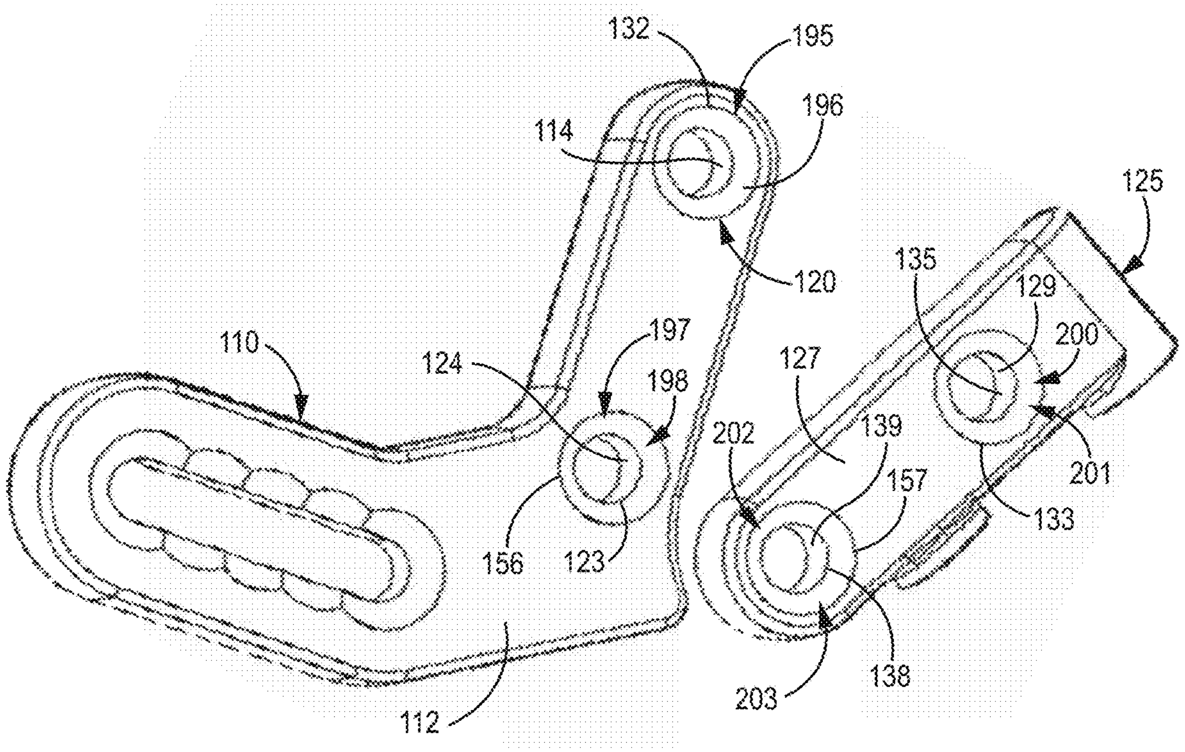
FIG. 7 is perspective view of the first arm and the second arm of FIG. 6, but showing a base-side surface of the first arm and a base-side surface of the second arm.

FIGS. 6 and 7 illustrate perspective views of the first arm 110 and the second arm 125 of the wheel lock device 100. FIG. 6 shows a first-linkage-element-side surface 113 of the first arm 110 and a first-linkage-element-side surface 128 of the second arm 125. FIG. 7 shows a base-side surface 112 of the first arm 110 and a base-side surface 127 of the second arm 125. The first-linkage-element-side surfaces 113, 128 can be opposite the respective base-side surfaces 112, 127.

In the illustrated embodiment of the wheel lock device 100, the first arm 110 and the second arm 125 can be configured to transfer a force applied at the actuator 185 so as to cause the foot 180 to engage and disengage a wheel of a wheeled device. In the example shown here, the first arm 110 and the second arm 125 can each be supported by the base 190. And, the first arm 110 and the second arm 125 can be coupled together by one or more linkage elements, such as the linkage elements 140, 225, and 215 as shown in the illustrated embodiment. As such, when a force is applied at the actuator 185 this force is transferred from the second arm 125 to the first arm 110 in a manner that causes the foot 180 to engage (when the applied force moves the actuator 185 to the engaged position) and disengage (when the applied force moves the actuator 185 to the disengaged position) the wheel.

The first arm 110 can define a first-arm first aperture 120 and a first-arm second aperture 123. In particular, the first arm 110 can include a first interior surface 114 that defines the first-arm first aperture 120, and the first arm 110 can include a second interior surface 124 that defines the first-arm second aperture 123. Each of the first-arm first aperture 120 and a first-arm second aperture 123 can extend through the first arm 110 from the base-side surface 112 to the first-linkage-element-side surface 113. And, each of the first-arm first aperture 120 and the first-arm second aperture 123 can be configured to receive a fastener therethrough, for instance as will be illustrated and described further herein. Namely, the first fastener 165 can extend through the first-arm first aperture 120, and the third fastener 171 can extend through the first-arm second aperture 123.

The second arm 125 can define a second-arm first aperture 135 and a second-arm second aperture 138. In particular, the second arm 125 can include a first interior surface 129 that defines the second-arm first aperture 135, and the second arm 125 can include a second interior surface 139 that defines the second-arm second aperture 138. Each of the second-arm first aperture 135 and a second-arm second aperture 138 can extend through the second arm 125 from the base-side surface 127 to the first-linkage-element-side surface 128. And, each of the second-arm first aperture 135 and the second-arm second aperture 138 can be configured to receive a fastener therethrough, for instance as will be illustrated and described further herein. Namely, the second fastener 170 can extend through the second-arm first aperture 135, and the fourth fastener 172 can extend through the second-arm second aperture 138.

To assist in supporting the arms 110, 125 at the base 190 and, in some cases, in efficiently transferring one or more force during operation of the wheel lock device 100, in the illustrated embodiment, the first arm 110 and the second arm 125 can each include one or more mating portions for mating with the base 190 and/or one or more linkage elements 140, 225, 215.

At the base-side surface 112, as shown in FIG. 7, the first arm 110 includes a first-arm/base mating portion 195. The first-arm/base mating portion 195 extends from the base-side surface 112 of the first arm 110 to the first-arm first aperture 120. Thus, as shown here, the first-arm/base mating portion 195 can begin where one end of the first-arm first aperture 120 terminates such that the first-arm/base mating portion 195 forms therein a continuation aperture 132 from the end of the first-arm first aperture 120 to an end of the first-arm/base mating portion 195 forming the base-side surface 112. The first-arm/base mating portion 195 includes a first-arm/base mating portion cross-sectional profile 196 that changes along a length of the first-arm/base mating portion 195 in a direction toward the first-arm first aperture 120 in a manner complementary to a base/first-arm mating portion cross-sectional profile of a base/first-arm mating portion of the base 190. In this way, these complementary mating portions allow the first-arm/base mating portion 195 to mate with the base/first-arm mating portion of the base 190.

Likewise, at the base-side surface 127 as shown in FIG. 7, the second arm 125 includes a second-arm/base mating portion 200. The second-arm/base mating portion 200 extends from the base-side surface 127 of the second arm 125 to the second-arm first aperture 135. Thus, as shown here, the second-arm/base mating portion 200 can begin where one end of the second-arm first aperture 135 terminates such that the second-arm/base mating portion 200 forms therein a continuation aperture 133 from the end of the second-arm first aperture 135 to an end of the second-arm/base mating portion 200 forming the base-side surface 127. The second-arm/base mating portion 200 includes a second-arm/base mating portion cross-sectional profile 201 that changes along a length of the second-arm/base mating portion 200 in a direction toward the second-arm first aperture 135 in a manner complementary to a base/second-arm mating portion cross-sectional profile of a base/second-arm mating portion of the base 190. In this way, these complementary mating portions allow the second-arm/base mating portion 200 to mate with the base/second-arm mating portion of the base 190.

In the illustrated embodiment, each of the first-arm/base mating portion cross-sectional profile 196 and the second-arm/base mating portion cross-sectional profile 201 decreases in cross-sectional width, along at least a portion of the length of the respective first-arm/base mating portion 195 and second-arm/base mating portion 200, in the direction toward the respective first-arm first aperture 120 and second-arm first aperture 135. For instance, in the example shown here, each of the first-arm/base mating portion cross-sectional profile 196 and the second-arm/base mating portion cross-sectional profile 201 defines a continual decrease in cross-section width, along at least a portion of the length of the respective first-arm/base mating portion 195 and second-arm/base mating portion 200, in the direction toward the respective first-arm first aperture 120 and second-arm first aperture 135. As such, in this example, each of the first-arm/base mating portion cross-sectional profile 196 and the second-arm/base mating portion cross-sectional profile 201 defines a generally conical respective first-arm/base mating portion 195 and second-arm/base mating portion 200. In the illustrated embodiment, each of the conical first-arm/base mating portion 195 and second-arm/base mating portion 200 can serve as a female conical mating portion for mating to the respective base mating portions (e.g., with each such respective base mating portion being a male conical mating portion). In another embodiment, each of the conical first-arm/base mating portion 195 and second-arm/base mating portion 200 can serve as a male conical mating portion for mating to the respective base mating portions (e.g., with each such respective base mating portion being a female conical mating portion).

Also at the base-side surface 112, as shown in FIG. 7, the first arm 110 includes a first-arm/second-linkage-element mating portion 197. The first-arm/second-linkage-element mating portion 197 extends from the base-side surface 112 of the first arm 110 to the first-arm second aperture 123. Thus, as shown here, the first-arm/second-linkage-element mating portion 197 can begin where one end of the first-arm second aperture 123 terminates such that the first-arm/second-linkage-element mating portion 197 forms therein a continuation aperture 156 from the end of the first-arm second aperture 123 to an end of the first-arm/second-linkage-element mating portion 197 forming the base-side surface 112. The first-arm/second-linkage-element mating portion 197 includes a first-arm/second-linkage-element mating portion cross-sectional profile 198 that changes along a length of the first-arm/second-linkage-element mating portion 197 in a direction toward the first-arm second aperture 123 in a manner complementary to the second-linkage-element/first-arm mating portion cross-sectional profile 231 of the second-linkage-element/first-arm mating portion 226. In this way, these complementary mating portions allow the first-arm/second-linkage-element mating portion 197 to mate with the second-linkage-element/first-arm mating portion 226.

Likewise, at the base-side surface 127 as shown in FIG. 7, the second arm 125 includes a second-arm/second-linkage-element mating portion 202. The second-arm/second-linkage-element mating portion 202 extends from the base-side surface 127 of the second arm 125 to the second-arm second aperture 138. Thus, as shown here, the second-arm/second-linkage-element mating portion 202 an begin where one end of the second-arm second aperture 138 terminates such that the second-arm/second-linkage-element mating portion 202 forms therein a continuation aperture 157 from the end of the second-arm second aperture 138 to an end of the second-arm/second-linkage-element mating portion 202 forming the base-side surface 127. The second-arm/second-linkage-element mating portion 202 includes a second-arm/second-linkage-element mating portion cross-sectional profile 203 that changes along a length of the second-arm/second-linkage-element mating portion 202 in a direction toward the second-arm second aperture 138 in a manner complementary to the second-linkage-element/second-arm mating portion cross-sectional profile 232 of the second-linkage-element/second-arm mating portion 227. In this way, these complementary mating portions allow the second-arm/second-linkage-element mating portion 202 to mate with the second-linkage-element/second-arm mating portion 227.

In the illustrated embodiment, each of the first-arm/second-linkage-element mating portion cross-sectional profile 198 and the second-arm/second-linkage-element mating portion cross-sectional profile 203 decreases in cross-sectional width, along at least a portion of the length of the respective first-arm/second-linkage-element mating portion 197 and second-arm/second-linkage-element mating portion 202, in the direction toward the respective first-arm second aperture 123 and second-arm second aperture 138. For instance, in the example shown here, each of the first-arm/second-linkage-element mating portion cross-sectional profile 198 and the second-arm/second-linkage-element mating portion cross-sectional profile 203 defines a continual decrease in cross-section width, along at least a portion of the length of the respective first-arm/second-linkage-element mating portion 197 and second-arm/second-linkage-element mating portion 202, in the direction toward the respective first-arm second aperture 123 and second-arm second aperture 138. As such, in this example, each of the first-arm/second-linkage-element mating portion cross-sectional profile 198 and the second-arm/second-linkage-element mating portion cross-sectional profile 20 defines a generally conical respective first-arm/second-linkage-element mating portion 197 and second-arm/second-linkage-element mating portion 202. In the illustrated embodiment, each of the conical first-arm/second-linkage-element mating portion 197 and second-arm/second-linkage-element mating portion 202 can serve as a female conical mating portion for mating to the respective linkage element mating portions (e.g., with each such respective linkage element mating portion being a male conical mating portion). In another embodiment, each of the conical first-arm/second-linkage-element mating portion 197 and second-arm/second-linkage-element mating portion 202 can serve as a male conical mating portion for mating to the respective linkage element mating portions (e.g., with each such respective linkage element mating portion being a female conical mating portion).

As noted, FIG. 6 shows the first-linkage-element-side surface 113 of the first arm 110 and the first-linkage-element-side surface 128 of the second arm 125. At the first-linkage-element-side surface 113, the first arm 110 includes a first-arm/first-linkage-element mating portion 115. The first-arm/first-linkage-element mating portion 115 extends from the first-linkage-element-side surface 113 of the first arm 110 to the first-arm first aperture 120. Thus, as shown here, the first-arm/first-linkage-element mating portion 115 can begin where one end of the first-arm first aperture 120 terminates such that the first-arm/first-linkage-element mating portion 115 forms therein a continuation aperture 161 from the end of the first-arm first aperture 120 to an end of the first-arm/first-linkage-element mating portion 115 forming the first-linkage-element-side surface 113. The first-arm/first-linkage-element mating portion 115 includes a first-arm/first-linkage-element mating portion cross-sectional profile 116 that changes along a length of the first-arm/first-linkage-element mating portion 115 in a direction toward the first-arm first aperture 120 in a manner complementary to a first-linkage-element/first-arm mating portion cross-sectional profile 146 of first-linkage-element/first-arm mating portion 145. In this way, these complementary mating portions allow the first-arm/first-linkage-element mating portion 115 to mate with the first-linkage-element/first-arm mating portion 145 of the first linkage element 140.

Likewise, at the first-linkage-element-side surface 128 as shown in FIG. 6, the second arm 125 includes a second-arm/first-linkage-element mating portion 130. The second-arm/first-linkage-element mating portion 130 extends from the first-linkage-element-side surface 128 of the second arm 125 to the second-arm first aperture 135. Thus, as shown here, the second-arm/first-linkage-element mating portion 130 can begin where one end of the second-arm first aperture 135 terminates such that the second-arm/first-linkage-element mating portion 130 forms therein a continuation aperture 162 from the end of the second-arm first aperture 135 to an end of the second-arm/first-linkage-element mating portion 130 forming the first-linkage-element-side surface 128. The second-arm/first-linkage-element mating portion 130 includes a second-arm/first-linkage-element mating portion cross-sectional profile 131 that changes along a length of the second-arm/first-linkage-element mating portion 130 in a direction toward the second-arm first aperture 135 in a manner complementary to a first-linkage-element/second-arm mating portion cross-sectional profile 151 of first-linkage-element/second-arm mating portion 150. In this way, these complementary mating portions allow the second-arm/first-linkage-element mating portion 130 to mate with the first-linkage-element/second-arm mating portion 150 of the first linkage element 140.

In the illustrated embodiment, each of the first-arm/first-linkage-element mating portion cross-sectional profile 116 and the second-arm/first-linkage-element mating portion cross-sectional profile 131 decreases in cross-sectional width, along at least a portion of the length of the respective first-arm/first-linkage-element mating portion 115 and second-arm/first-linkage-element mating portion 130, in the direction toward the respective first-arm first aperture 120 and second-arm first aperture 135. For instance, in the example shown here, each of the first-arm/first-linkage-element mating portion cross-sectional profile 116 and the second-arm/first-linkage-element mating portion cross-sectional profile 131 defines a continual decrease in cross-section width, along at least a portion of the length of the respective first-arm/first-linkage-element mating portion 115 and second-arm/first-linkage-element mating portion 130, in the direction toward the respective first-arm first aperture 120 and second-arm first aperture 135. As such, in this example, each of the first-arm/first-linkage-element mating portion cross-sectional profile 116 and the second-arm/first-linkage-element mating portion cross-sectional profile 131 defines a generally conical respective first-arm/first-linkage-element mating portion 115 and second-arm/first-linkage-element mating portion 130. In the illustrated embodiment, each of the conical first-arm/first-linkage-element mating portion 115 and second-arm/first-linkage-element mating portion 130 can serve as a female conical mating portion for mating to the respective linkage element mating portions (e.g., with each such respective linkage element mating portion being a male conical mating portion). In another embodiment, each of the conical first-arm/first-linkage-element mating portion 115 and second-arm/first-linkage-element mating portion 130 can serve as a male conical mating portion for mating to the respective linkage element mating portions (e.g., with each such respective linkage element mating portion being a female conical mating portion).

Also at the first-linkage-element-side surface 113, as shown in FIG. 6, the first arm 110 includes a first-arm/third-linkage-element mating portion 121. The first-arm/third-linkage-element mating portion 121 extends from the first-linkage-element-side surface 113 of the first arm 110 to the first-arm second aperture 123. Thus, as shown here, the first-arm/third-linkage-element mating portion 121 can begin where one end of the first-arm second aperture 123 terminates such that the first-arm/third-linkage-element mating portion 121 forms therein a continuation aperture 163 from the end of the first-arm second aperture 123 to an end of the first-arm/third-linkage-element mating portion 121 forming the first-linkage-element-side surface 113. The first-arm/third-linkage-element mating portion 121 includes a first-arm/third-linkage-element mating portion cross-sectional profile 122 that changes along a length of the first-arm/third-linkage-element mating portion 121 in a direction toward the first-arm second aperture 123 in a manner complementary to a third-linkage-element/first-arm mating portion cross-sectional profile 221 of third-linkage-element/first-arm mating portion 216. In this way, these complementary mating portions allow the first-arm/third-linkage-element mating portion 121 to mate with the third-linkage-element/first-arm mating portion 216 of the third linkage element 215.

Likewise, at the first-linkage-element-side surface 128 as shown in FIG. 6, the second arm 125 includes a second-arm/third-linkage-element mating portion 136. The second-arm/third-linkage-element mating portion 136 extends from the first-linkage-element-side surface 128 of the second arm 125 to the second-arm second aperture 138. Thus, as shown here, the second-arm/third-linkage-element mating portion 136 can begin where one end of the second-arm second aperture 138 terminates such that the second-arm/third-linkage-element mating portion 136 forms therein a continuation aperture 164 from the end of the second-arm second aperture 138 to an end of the second-arm/third-linkage-element mating portion 136 forming the first-linkage-element-side surface 128. The second-arm/third-linkage-element mating portion 136 includes a second-arm/third-linkage-element mating portion cross-sectional profile 137 that changes along a length of the second-arm/third-linkage-element mating portion 136 in a direction toward the second-arm second aperture 138 in a manner complementary to a third-linkage-element/second-arm mating portion cross-sectional profile 222 of third-linkage-element/second-arm mating portion 217. In this way, these complementary mating portions allow the second-arm/third-linkage-element mating portion 136 to mate with the third-linkage-element/second-arm mating portion 217 of the third linkage element 215.

In the illustrated embodiment, each of the first-arm/third-linkage-element mating portion cross-sectional profile 122 and the second-arm/third-linkage-element mating portion cross-sectional profile 137 decreases in cross-sectional width, along at least a portion of the length of the respective first-arm/third-linkage-element mating portion 121 and second-arm/third-linkage-element mating portion 136, in the direction toward the respective first-arm second aperture 123 and second-arm second aperture 138. For instance, in the example shown here, each of the first-arm/third-linkage-element mating portion cross-sectional profile 122 and the second-arm/third-linkage-element mating portion cross-sectional profile 137 defines a continual decrease in cross-section width, along at least a portion of the length of the respective first-arm/third-linkage-element mating portion 121 and second-arm/third-linkage-element mating portion 136, in the direction toward the respective first-arm second aperture 123 and second-arm second aperture 138. As such, in this example, each of the first-arm/third-linkage-element mating portion cross-sectional profile 122 and the second-arm/third-linkage-element mating portion cross-sectional profile 137 defines a generally conical respective first-arm/third-linkage-element mating portion 121 and second-arm/third-linkage-element mating portion 136. In the illustrated embodiment, each of the conical first-arm/third-linkage-element mating portion 121 and second-arm/third-linkage-element mating portion 136 can serve as a female conical mating portion for mating to the respective linkage element mating portions (e.g., with each such respective linkage element mating portion being a male conical mating portion). In another embodiment, each of the conical first-arm/third-linkage-element mating portion 121 and second-arm/third-linkage-element mating portion 136 can serve as a male conical mating portion for mating to the respective linkage element mating portions (e.g., with each such respective linkage element mating portion being a female conical mating portion).

Figure 8:
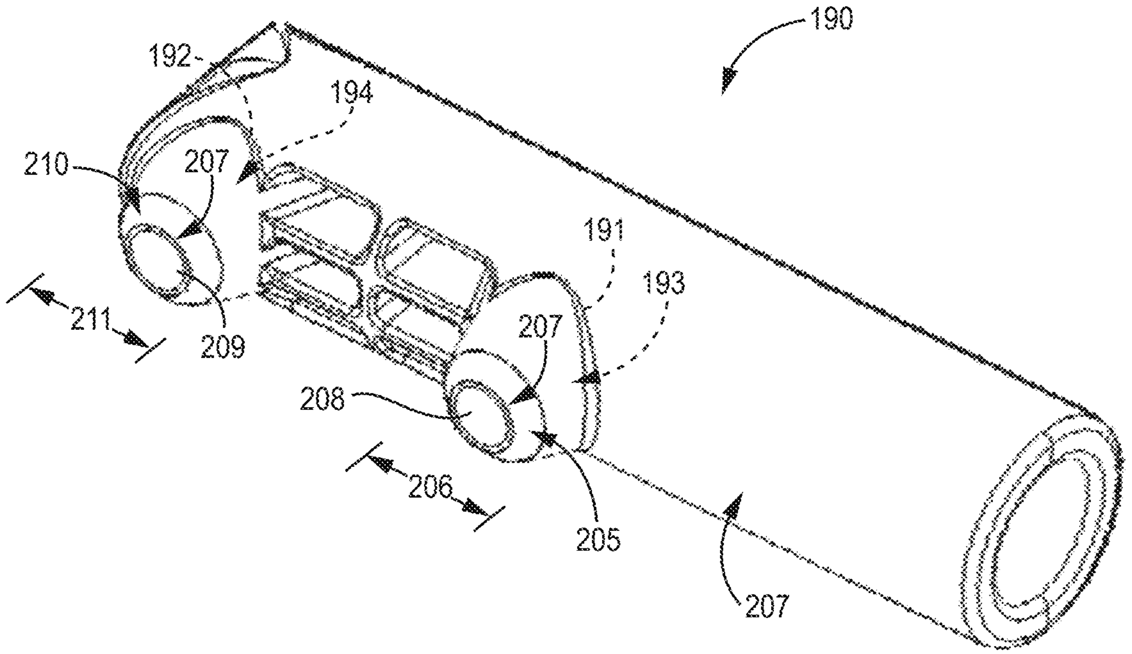
FIG. 8 is a perspective view of an embodiment of a base of the wheel lock device of FIG. 1.

FIG. 8 illustrates a perspective view of the base 190 of the wheel lock device 100. FIG. 8 illustrates a base surface 207 of the base 190. The base surface 207 can be an arm-side surface of the base 190 facing the first arm 110 and the second arm 125 of the wheel lock device 100.

As noted, the base 190 can define the base first aperture 193 and the base second aperture 194. In particular, the base 190 can include a first interior surface 191 that defines the base first aperture 193, and the base 190 can include a second interior surface 192 that defines the base second aperture 194. Each of the base first aperture 193 and the base second aperture 194 can extend at least partly into the base 190 from the base surface 207. And, each of the base first aperture 193 and the base second aperture 194 can be configured to receive a fastener therein, for instance as will be illustrated and described further herein. Namely, the first fastener 165 can extend into the base first aperture 193, and the second fastener 170 can extend into the base second aperture 194.

In the illustrated embodiment of the wheel lock device 100, the base 190 supports and couples to the first arm 110 to the second arm 125. To do so, the base 190 includes the base/first-arm mating portion 205 for coupling to the complementary first-arm/base mating portion 195 at the first arm 110, and the base 190 includes the base/second-arm mating portion 210 for coupling to the complementary second-arm/base mating portion 200 at the second arm 125.

The base/first-arm mating portion 205 extends from the base surface 207 to the base first aperture 193. Thus, as shown here, the base/first-arm mating portion 205 can begin where one end of the base first aperture 193 terminates such that the base/first-arm mating portion 205 forms therein a continuation aperture 208 from the end of the base first aperture 193 to an end of the base/first-arm mating portion 205 forming an outermost portion of the base surface 207. The base/first-arm mating portion 205 includes a base/first-arm mating portion cross-sectional profile 206. As shown here, the base/first-arm mating portion cross-sectional profile 206 changes along a length of the base/first-arm mating portion 205 in a direction toward the base first aperture 193 in a manner complementary to the first-arm/base mating portion cross-sectional profile 196 of the first-arm/base mating portion 195. In this way, these complementary mating portions allow the base/first-arm mating portion 205 to mate with the first-arm/base mating portion 195 of the first arm 110.

Likewise, the base/second-arm mating portion 210 extends from the base surface 207 to the base second aperture 194. Thus, as shown here, the base/second-arm mating portion 210 can begin where one end of the base second aperture 194 terminates such that the base/second-arm mating portion 210 forms therein a continuation aperture 209 from the end of the base second aperture 194 to an end of the base/second-arm mating portion 210 forming an outermost portion of the base surface 207. The base/second-arm mating portion 210 includes a base/second-arm mating portion cross-sectional profile 211. As shown here, the base/second-arm mating portion cross-sectional profile 211 changes along a length of the base/second-arm mating portion 210 in a direction toward the base second aperture 194 in a manner complementary to the second-arm/base mating portion cross-sectional profile 201 of the second-arm/base mating portion 200. In this way, these complementary mating portions allow the base/second-arm mating portion 210 to mate with the second-arm/base mating portion 200 of the second arm 125.

In the illustrated embodiment, each of the base/first-arm mating portion cross-sectional profile 206 and base/second-arm mating portion cross-sectional profile 211 decreases in cross-sectional width, along at least a portion of the length of the respective base/first-arm mating portion 205 and base/second-arm mating portion 210, in the direction toward the respective base first aperture 193 and base second aperture 194. For instance, in the example shown here, each of the base/first-arm mating portion cross-sectional profile 206 and base/second-arm mating portion cross-sectional profile 211 defines a continual decrease in cross-section width, along at least a portion of the length of the respective base/first-arm mating portion 205 and base/second-arm mating portion 210, in the direction toward the respective base first aperture 193 and base second aperture 194. As such, in this example, each of the base/first-arm mating portion cross-sectional profile 206 and base/second-arm mating portion cross-sectional profile 211 defines a generally conical respective base/first-arm mating portion 205 and base/second-arm mating portion 210. In the illustrated embodiment, each of the conical base/first-arm mating portion 205 and base/second-arm mating portion 210 can serve as a male conical mating portion for mating with the respective first-arm/base mating portion 195 of the first arm 110 and second-arm/base mating portion 200 of the second arm 125 (e.g., with each of the first-arm/base mating portion 195 and second-arm/base mating portion 200 being a female conical mating portion). In another embodiment, each of the conical base/first-arm mating portion 205 and base/second-arm mating portion 210 can serve as a female conical mating portion for mating with the respective first-arm/base mating portion 195 of the first arm 110 and second-arm/base mating portion 200 of the second arm 125 (e.g., with each of the first-arm/base mating portion 195 and second-arm/base mating portion 200 being a male conical mating portion).

Figure 9:
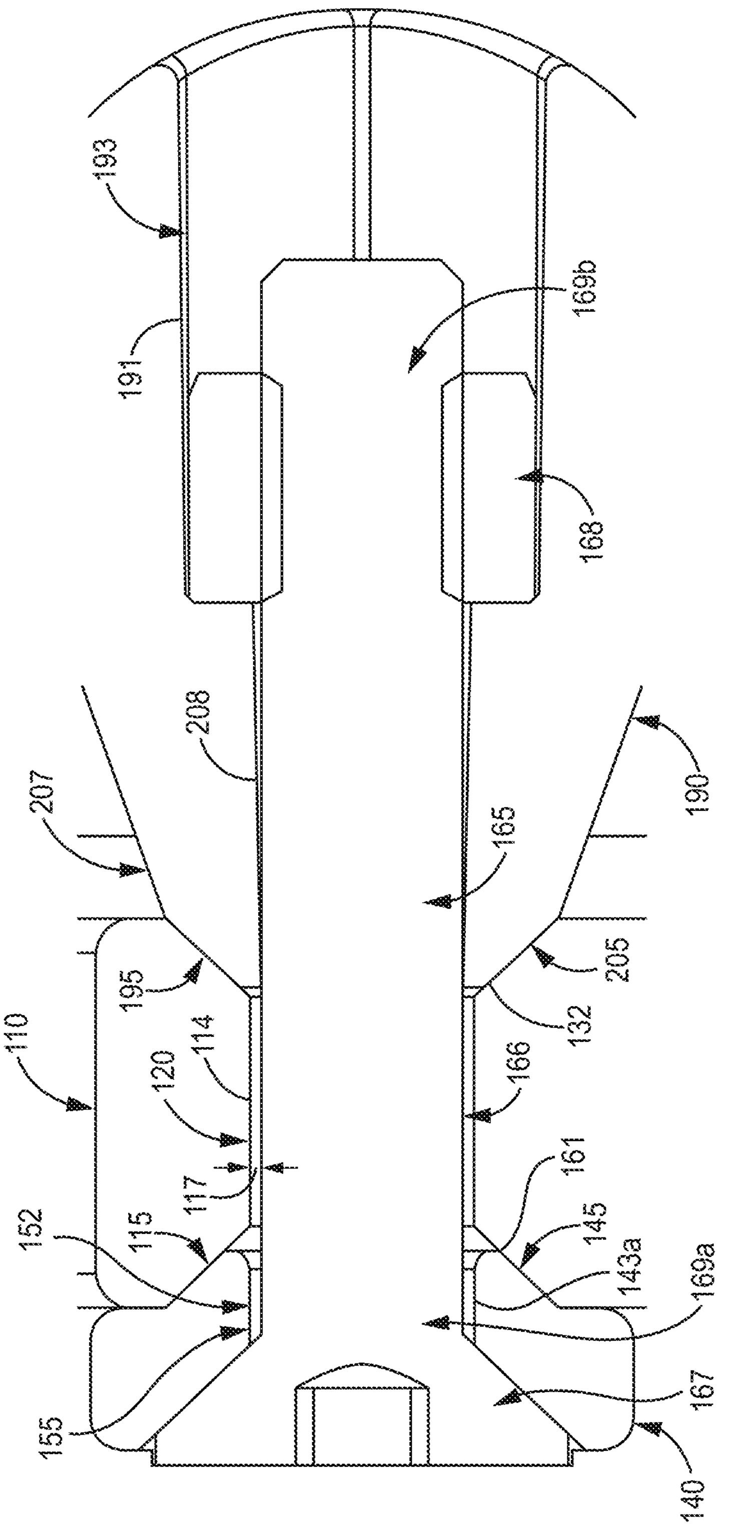
FIG. 9 is a cross-sectional view, taken along line A-A in FIG. 1, of a first fastener extending through components of the wheel lock device of FIG. 1.

FIG. 9 illustrates a cross-sectional view, taken along line A-A in FIG. 1. The cross-section of FIG. 9 shows one exemplary embodiment with the first fastener 165 extending through the base first aperture 193, the base/first-arm mating portion 205, the first-arm/base mating portion 195, the first-arm first aperture 120, the first-arm/first-linkage-element mating portion 115, and the first-linkage-element/first-arm mating portion 145, and the first-linkage-element first aperture 155.

The first fastener 165 can include a first fastener body 166, a first fastener first head 167, and a first fastener second head 168. The first fastener body 166 can include a first end portion 169*a* and a second end portion 169*b*. As shown in the illustrated example, the first fastener first head 167 is at the first end portion 169*a* of the first fastener body 166, and the first fastener second head 168 is at the second end portion 169*b* of the first fastener body 166.

The first fastener 165 can extend through one or more components of the wheel lock device 100 such that a space is defined between the first fastener 165 and the one or more components of the wheel lock device 100.

For example, as shown in the embodiment of FIG. 9, the first fastener 165 extends through the first-arm/base mating portion 195 and the first-arm first aperture 120 such that a first space 117 is defined between the first fastener 165 and the first interior surface 114 of the first arm 110. More specifically, in this example, the first fastener body 166 extends through the first-arm/base mating portion 195 and the first-arm first aperture 120 such that the first space 117 is defined between the first fastener body 166 and the first interior surface 114 of the first arm 110. As also shown in this example, the first fastener 165 extends through the base first aperture 193, the base/first-arm mating portion 205, the first-arm/base mating portion 195, and the first-arm first aperture 120 such that the first space 117 is defined between the first fastener 165 (e.g., the first fastener body 166) and each of the first interior surface 191 of the base 190 and the first interior surface 114 of the first arm 110. And, in the illustrated example, the first fastener body 166 extends through the first-arm first aperture 120, the first-arm/first-linkage-element mating portion 115, the first-linkage-element/first-arm mating portion 145, and the first-linkage-element first aperture 155 such that the first space 117 is defined between the first fastener body 166 and each of the first interior surface 114 of the first arm 110 and the first interior surface 143*a* of the first linkage element 140. Accordingly, in the illustrated example, the first fastener 165 may not contact the base first aperture 193, the base/first-arm mating portion 205, the first-arm/base mating portion 195, the first-arm first aperture 120, the first-arm/first-linkage-element mating portion 115, the first-linkage-element/first-arm mating portion 145, or the first-linkage-element first aperture 155.

Figure 10:
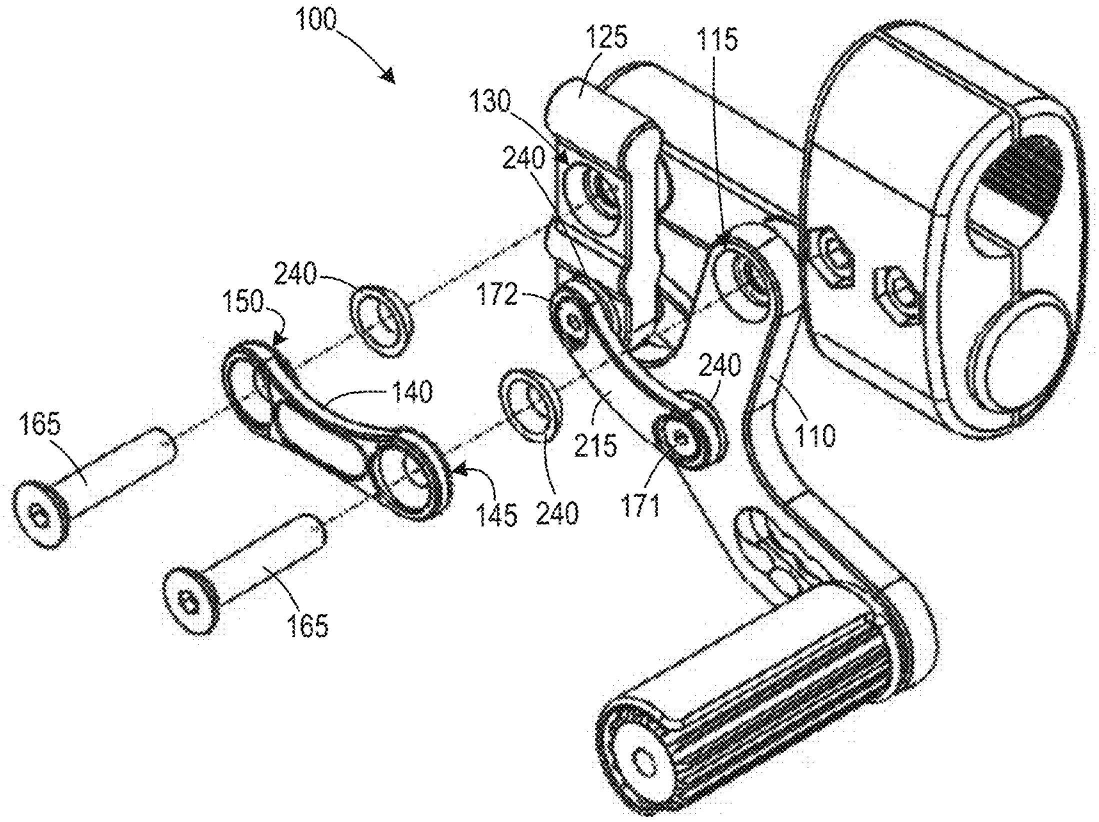
FIG. 10 is an exploded, perspective view of a wheel lock device.

FIG. 10 shows bushing components 240 that can be incorporated into some embodiments of the wheel lock device 100. As shown, a bushing component 240 can be positioned between the first-arm/first-linkage-element mating portion 115 and the first-linkage-element/first-arm mating portion 145 as the first-arm/first-linkage-element mating portion 115 mates with the first-linkage-element/first-arm mating portion 145. Another bushing component 240 can be positioned between the second-arm/first-linkage-element mating portion 130 and the first-linkage-element/second-arm mating portion 150 as the second-arm/first-linkage-element mating portion 130 mates with the first-linkage-element/second-arm mating portion 150. The bushing components 240 may be positioned at the interface of the first-arm/first-linkage-element mating portion 115 and the first-linkage-element/first-arm mating portion 145 and of the second-arm/first-linkage-element mating portion 130 and the first-linkage-element/second-arm mating portion 150. FIG. 10 also shows bushing components 240 positioned at the interface of the third linkage element 215 and the first arm 110 and at the interface of the third linkage element 215 and the second arm 125. In some embodiments, a bushing component 240 can be positioned between, or at the interface of, the base/first-arm mating portion (205 in FIGS. 2, 8, and 9) and the first-arm/base mating portion (195 in FIGS. 7 and 9). In some embodiments, a bushing component 240 can be positioned between, or at the interface of, the base/second-arm mating portion (210 in FIGS. 2 and 8) and the second-arm/base mating portion (200 in FIG. 7). In some embodiments, a bushing component 240 can be positioned between, or at the interface of, the second-linkage-element/first-arm mating portion (226 in FIG. 5) and the first-arm/second-linkage-element mating portion (197 in FIG. 7). In some embodiments, a bushing component 240 can be positioned between, or at the interface of, the second-linkage-element/second-arm mating portion (227 in FIG. 5) and the second-arm/second-linkage-element mating portion (202 in FIG. 7). In various wheel lock device embodiments, a bushing component 240 may be positioned between mating portions of one pair of components, between mating portions of multiple pairs of components, or between mating portions of all pairs of components. The shape of a bushing component 240 may be complementary with the shapes of the mating portions between which the bushing component 240 is configured to be positioned. The bushing component 240 may improve durability of the various components in the wheel lock device.

Referring again to FIG. 9, one or more (e.g., each) of the second fastener 170, the third fastener 171, and the fourth fastener 172 can extend through the respective components of the wheel lock device 100 as illustrated and described for the first fastener 165 with respect to FIG. 9.

Namely, the second fastener 170 can extend through the base second aperture 194, the base/second-arm mating portion 210, the second-arm/base mating portion 200, the second-arm first aperture 135, the second-arm/first-linkage-element mating portion 130, the first-linkage-element/second-arm mating portion 150, and the first-linkage-element second aperture 160. For example, similar to that illustrated for the first fastener 165, the second fastener 170 can extend through the second-arm/base mating portion 200 and the second-arm first aperture 135 such that a second space (e.g., the same as that illustrated for the first space 117 with respect to the first fastener 165) is defined between the second fastener 170 and the first interior surface 129 of the second arm 125. Thus, like that described and illustrated for the first fastener 165, the second fastener 170 may not contact the base second aperture 194, the base/second-arm mating portion 210, the second-arm/base mating portion 200, the second-arm first aperture 135, the second-arm/first-linkage-element mating portion 130, the first-linkage-element/second-arm mating portion 150, or the first-linkage-element second aperture 160.

The third fastener 171 can extend through the second-linkage-element first aperture 228, the second-linkage-element/first-arm mating portion 226, the first-arm/second-linkage-element mating portion 197, the first-arm second aperture 123, the first-arm/third-linkage-element mating portion 121, the third-linkage-element/first-arm mating portion 216, and the third-linkage-element first aperture 218. For example, similar to that illustrated for the first fastener 165, the third fastener 171 can extend through the first-arm/second-linkage-element mating portion 197 and the first-arm second aperture 123 such that a third space (e.g., the same as that illustrated for the first space 117 with respect to the first fastener 165) is defined between the third fastener 171 and the second interior surface 124 of the first arm 110. Thus, like that described and illustrated for the first fastener 165, the third fastener 171 may not contact the second-linkage-element first aperture 228, the second-linkage-element/first-arm mating portion 226, the first-arm/second-linkage-element mating portion 197, the first-arm second aperture 123, the first-arm/third-linkage-element mating portion 121, the third-linkage-element/first-arm mating portion 216, or the third-linkage-element first aperture 218.

The fourth fastener 172 can extend through the second-linkage-element second aperture 229, the second-linkage-element/second-arm mating portion 227, the second-arm/second-linkage-element mating portion 202, the second-arm second aperture 138, the second-arm/third-linkage-element mating portion 136, the third-linkage-element/second-arm mating portion 217, and the third-linkage-element second aperture 219. For example, similar to that illustrated for the first fastener 165, the fourth fastener 172 can extend through the second-arm/second-linkage-element mating portion 202 and the second-arm second aperture 138 such that a fourth space (e.g., the same as that illustrated for the first space 117 with respect to the first fastener 165) is defined between the fourth fastener 2 and the second interior surface 139 of the second arm 125. Thus, like that described and illustrated for the first fastener 165, the fourth fastener 172 may not contact the second-linkage-element second aperture 229, the second-linkage-element/second-arm mating portion 227, the second-arm/second-linkage-element mating portion 202, the second-arm second aperture 138, the second-arm/third-linkage-element mating portion 136, the third-linkage-element/second-arm mating portion 217, or the third-linkage-element second aperture 219.

The disclosed configuration of the component mating portions, and associated component mating portion cross-sectional profiles, can facilitate the above described one or more spaces between one or more fasteners and the one or more components of the wheel lock device 100. This can be helpful in extending the useful life of the one or more fasteners, as it can reduce wear on such fasteners by reducing, or eliminating, the application of particular forces on the one or more fasteners. For example, this can result in the majority (e.g., all) of the force imparted on the one or more fasteners being in an axial direction (e.g., tensile force(s) in the axial direction with little, or no, radial (e.g., shear) or torsional forces (e.g., friction)).

In addition, the disclosed configuration of the component mating portions, and associated component mating portion cross-sectional profiles, can facilitate extended useful life of the one or more fasteners by reducing, or eliminating, movement of the one or more fasteners when the actuator 185 is moved. This can result because the reduction, or elimination, of movement of the one or more fasteners relative to the interfacing one or more component mating portions can reduce, or eliminate, radial (e.g., shear) or torsional forces (e.g., friction) on the one or more fasteners.

More specifically, the actuator 185, of the wheel lock device 100, can be configured to move between the engaged position 187 and the disengaged position 186. In particular, in the illustrated embodiment of the wheel lock device 100, when a force is applied at the actuator 185 this force is transferred from the second arm 125 to the first arm 110 in a manner to cause the foot 180 to engage a wheel of a wheeled device, when the force is applied to move the actuator 185 to the engaged position 187, and disengage a wheel of the wheeled device, when the force is applied to move the actuator 185 to the disengaged position. To improve the wheel lock device's ability to withstand various forces and, thereby, increase the useful life of one or more components, component mating portions, and associated component mating portion cross-sectional profiles, can facilitate relative movement between mated component mating portions while reducing, or eliminating, movement of the one or more fasteners relative to the interfacing one or more component mating portions.

For example, when the actuator 185 is moved between the engaged position and the disengaged position, the base/first-arm mating portion 205 can move relative to the first-arm/base mating portion 195, and the base/second-arm mating portion 210 can move relative to the second-arm/base mating portion 200. And, while the base/first-arm mating portion 205 moves relative to the first-arm/base mating portion 195, the portion of the first fastener 165 extending within the mated base/first-arm mating portion 205 and first-arm/base mating portion 195 can remain stationary relative to the base/first-arm mating portion 205 and first-arm/base mating portion 195. Likewise, while the base/second-arm mating portion 210 moves relative to the second-arm/base mating portion 200, the portion of the second fastener 170 extending within the mated base/second-arm mating portion 210 and second-arm/base mating portion 200 can remain stationary relative to the base/second-arm mating portion 210 and the second-arm/base mating portion 200. The same relative movement between component mating portions, with a fastener remaining stationary relative to the component mating portions, can apply to one or more other mated components of the wheel lock device 100.

Thus, wheel lock device embodiments disclosed herein can include one or more complementary component mating portions configured to efficiently withstand forces imparted on the wheel lock device during use and, thereby, increase the longevity of the wheel lock device. This, in turn, can lead to cost savings associated with the wheel lock device over its useful life. As one example, some wheel lock device embodiments disclosed herein can include component mating portions having complementary cross-sectional profiles at mating interfaces so as to configure such components to efficiently transfer, from one mated component to the other, one or more forces experienced during use of the wheel lock device. Further, as described above, n some such examples, the component mating portions having complementary cross-sectional profiles that can act to reduce wear on a fastener extending within these components and, thereby, increase the useful life of the fastener. In one example, the complementary cross-sectional profiles of the component mating portions can be configured to allow the fastener to extend through respective apertures of the mated components without the fastener contacting the interior surfaces defining such apertures and/or keeping the fastener stationary as the mated components move relative to one another. This can be especially useful in various wheel lock devices where the fastener is often be the first component to wear out.

Various examples have been described. These and other examples are within the scope of the following claims.

What is claimed is:

1. A wheel lock device comprising:
- a mounting clamp configured to couple to a wheeled device;
- a base extending from the mounting clamp and defining a base first aperture and a base second aperture, the base including:
  - a base/first-arm mating portion extending from a base surface to the base first aperture and including a base/first-arm mating portion cross-sectional profile that changes along a length of the base/first-arm mating portion in a direction toward the base first aperture, and
  - a base/second-arm mating portion extending from the base surface to the base second aperture and including a base/second-arm mating portion cross-sectional profile that changes along a length of the base/second-arm mating portion in a direction toward the base second aperture;
- a first arm supported by the base and defining a first-arm first aperture, the first arm including a first-arm/base mating portion that extends from a base-side surface of the first arm to the first-arm first aperture and that includes a first-arm/base mating portion cross-sectional profile that changes along a length of the first-arm/base mating portion in a direction toward the first-arm first aperture in a manner complementary to the base/first-arm mating portion cross-sectional profile such that the first-arm/base mating portion mates with the base/first-arm mating portion;
- a second arm supported by the base and defining a second-arm first aperture, the second arm including a second-arm/base mating portion that extends from a base-side surface of the second arm to the second-arm first aperture and that includes a second-arm/base mating portion cross-sectional profile that changes along a length of the second-arm/base mating portion in a direction toward the second-arm first aperture in a manner complementary to the base/second-arm mating portion cross-sectional profile such that the second-arm/base mating portion mates with the base/second-arm mating portion;
- a first fastener extending through the base first aperture, the base/first-arm mating portion, the first-arm/base mating portion, and the first-arm first aperture;
- a second fastener extending through the base second aperture, the base/second-arm mating portion, the second-arm/base mating portion, and the second-arm first aperture;
- a foot coupled to the first arm; and
- an actuator coupled to the second arm and configured to move between an engaged position in which the foot is configured to engage a wheel of the wheeled device and a disengaged position in which the foot is configured to disengage the wheel of the wheeled device.

2. The device of claim 1, wherein a first interior surface of the first arm defines the first-arm first aperture, and wherein the first fastener extends through the first-arm/base mating portion and the first-arm first aperture such that a first space is defined between the first fastener and the first interior surface of the first arm.

3. The device of claim 2, wherein the first fastener has a first fastener body, a first fastener first head at a first end portion of the first fastener body, and a first fastener second head at a second end portion of the first fastener body, and wherein the first fastener body extends through the first-arm/base mating portion and the first-arm first aperture such that the first space is defined between the first fastener body and the first interior surface of the first arm.

4. The device of claim 2, wherein the first interior surface of the first arm defines the first-arm first aperture, and a first interior surface of the base defines the base first aperture, and wherein the first fastener extends through the base first aperture, the base/first-arm mating portion, the first-arm/base mating portion, and the first-arm first aperture such that the first space is defined between the first fastener and each of the first interior surface of the base and the first interior surface of the first arm.

5. The device of claim 2, wherein a first interior surface of the second arm defines the second-arm first aperture, and wherein the second fastener extends through the second-arm/base mating portion and the second-arm first aperture such that a second space is defined between the second fastener and the first interior surface of the second arm.

6. The device of claim 2, wherein:
- the first arm includes a first-arm/linkage-element mating portion and defines a first-arm second aperture, the first-arm/linkage-element mating portion extending from the base-side surface of the first arm to the first-arm second aperture, the first-arm/linkage-element mating portion including a first-arm/linkage-element mating portion cross-sectional profile that changes along a length of the first-arm/linkage-element mating portion in a direction toward the first-arm second aperture,
- the second arm includes a second-arm/linkage-element mating portion and defines a second-arm second aperture, the second-arm/linkage-element mating portion extending from the base-side surface of the second arm to the second-arm second aperture, the second-arm/linkage-element mating portion including a second-arm/linkage-element mating portion cross-sectional profile that changes along a length of the second-arm/linkage-element mating portion in a direction toward the second-arm second aperture, and
- the device further comprises:
- a linkage element coupling the first arm to the second arm and defining a linkage-element first aperture and a linkage-element second aperture, the linkage element including:
  - a linkage-element/first-arm mating portion extending from an arm-side surface of the linkage element to the linkage-element first aperture and including a linkage-element/first-arm mating portion cross-sectional profile that changes along a length of the linkage-element/first-arm mating portion in a direction toward the linkage-element first aperture in a manner complementary to the first-arm/linkage-element mating portion cross-sectional profile such that the linkage-element/first-arm mating portion mates with the first-arm/linkage-element mating portion, a linkage-element/second-arm mating portion extending from the arm-side surface of the linkage element to the linkage-element second aperture and including a linkage-element/second-arm mating portion cross-sectional profile that changes along a length of the linkage-element/second-arm mating portion in a direction toward the linkage-element second aperture in a manner complementary to the second-arm/linkage-element mating portion cross-sectional profile such that the linkage-element/second-arm mating portion mates with the second-arm/linkage-element mating portion, a third fastener extending through the linkage-element first aperture, the linkage-element/first-arm mating portion, the first-arm/linkage-element mating portion, and the first-arm second aperture, and a fourth fastener extending through the linkage-element second aperture, the linkage-element/second-arm mating portion, the second-arm/linkage-element mating portion, and the second-arm second aperture.

7. The device of claim 6, wherein:

a first interior surface of the second arm defines the second-arm first aperture, the second fastener extending through the second-arm/base mating portion and the second-arm first aperture such that a second space is defined between the second fastener and the first interior surface of the second arm, a second interior surface of the first arm defines the first-arm second aperture, the third fastener extending through the first-arm/linkage-element mating portion and the first-arm second aperture such that a third space is defined between the third fastener and the second interior surface of the first arm, and a second interior surface of the second arm defines the second-arm second aperture, the fourth fastener extending through the second-arm/linkage-element mating portion and the second-arm second aperture such that a fourth space is defined between the fourth fastener and the second interior surface of the second arm.

8. The device of claim 1, wherein, when the actuator is moved between the engaged position and the disengaged position, the base/first-arm mating portion moves relative to the first-arm/base mating portion, and the base/second-arm mating portion moves relative to the second-arm/base mating portion.

9. The device of claim 1, wherein the first-arm/base mating portion cross-sectional profile decreases along the length of the first-arm/base mating portion in the direction toward the first-arm first aperture, and wherein the base/first-arm mating portion cross-sectional profile decreases along the length of the base/first-arm mating portion in the direction toward the base first aperture.

10. The device of claim 1, wherein one of the first-arm/base mating portion and the base/first-arm mating portion comprises a first male conical mating portion and the other of the first-arm/base mating portion and the base/first-arm mating portion comprises a first female conical mating portion.

11. The device of claim 10, wherein one of the second-arm/base mating portion and the base/second-arm mating portion comprises a second male conical mating portion and the other of the second-arm/base mating portion and the base/second-arm mating portion comprises a second female conical mating portion.

12. The device of claim 1, further comprising a bushing component positioned between the first-arm/base mating portion and the base/first-arm mating portion as the first-arm/base mating portion mates with the base/first-arm mating portion.

13. The device of claim 1, wherein:

the first arm includes a first-arm/first-linkage-element mating portion extending from a first-linkage-element-side surface of the first arm to the first-arm first aperture and including a first-arm/first-linkage-element mating portion cross-sectional profile that changes along a length of the first-arm/first-linkage-element mating portion in a direction toward the first-arm first aperture, the second arm includes a second-arm/first-linkage-element mating portion extending from a first-linkage-element-side surface of the second arm to the second-arm first aperture and including a second-arm/first-linkage-element mating portion cross-sectional profile that changes along a length of the second-arm/first-linkage-element mating portion in a direction toward the second-arm first aperture, the device further comprises:

a first linkage element coupling the first arm to the second arm and defining a first-linkage-element first aperture and a first-linkage-element second aperture, the first linkage element including:

a first-linkage-element/first-arm mating portion extending from an arm-side surface of the first linkage element to the first-linkage-element first aperture and including a first-linkage-element/first-arm mating portion cross-sectional profile that changes along a length of the first-linkage-element/first-arm mating portion in a direction toward the first-linkage-element first aperture in a manner complementary to the first-arm/first-linkage-element mating portion cross-sectional profile such that the first-linkage-element/first-arm mating portion mates with the first-arm/first-linkage-element mating portion, a first-linkage-element/second-arm mating portion extending from the arm-side surface of the first linkage element to the first-linkage-element second aperture and including a first-linkage-element/second-arm mating portion cross-sectional profile that changes along a length of the first-linkage-element/second-arm mating portion in a direction toward the first-linkage-element second aperture in a manner complementary to the second-arm/first-linkage-element mating portion cross-sectional profile such that the first-linkage-element/second-arm mating portion mates with the second-arm/first-linkage-element mating portion, wherein:

the first fastener extends through the first-arm/first-linkage-element mating portion, the first-linkage-element/first-arm mating portion, and the first-linkage-element first aperture, and the second fastener extends through the second-arm/first-linkage-element mating portion, the first-linkage-element/second-arm mating portion, and the first-linkage-element second aperture.

14. The device of claim 13, wherein:

a first interior surface of the first arm defines the first-arm first aperture, and a first interior surface of the first linkage element defines the first-linkage-element first aperture, the first fastener has a first fastener body, a first fastener first head at a first end portion of the first fastener body, and a first fastener second head at a second end portion of the first fastener body, and the first fastener body extends through the first-arm first aperture, the first-arm/first-linkage-element mating portion, the first-linkage-element/first-arm mating portion, and the first-linkage-element first aperture such that a first space is defined between the first fastener body and each of the first interior surface of the first arm and the first interior surface of the first linkage element.

15. The device of claim 13, wherein:

the first arm defines a first-arm second aperture and further comprises:

a first-arm/second-linkage-element mating portion extending from the base-side surface of the first arm to the first-arm second aperture and including a first-arm/second-linkage-element mating portion cross-sectional profile that changes along a length of the first-arm/second-linkage-element mating portion in a direction toward the first-arm second aperture, and a first-arm/third-linkage-element mating portion extending from the first-linkage-element-side surface of the first arm to the first-arm second aperture and including a first-arm/third-linkage-element mating portion cross-sectional profile that changes along a length of the first-arm/third-linkage-element mating portion in a direction toward the first-arm second aperture, the second arm defines a second-arm second aperture and further comprises:

a second-arm/second-linkage-element mating portion extending from the base-side surface of the second arm to the second-arm second aperture and including a second-arm/second-linkage-element mating portion cross-sectional profile that changes along a length of the second-arm/second-linkage-element mating portion in a direction toward the second-arm second aperture, and a second-arm/third-linkage-element mating portion extending from the first-linkage-element-side surface of the second arm to the second-arm second aperture and including a second-arm/third-linkage-element mating portion cross-sectional profile that changes along a length of the second-arm/third-linkage-element mating portion in a direction toward the second-arm second aperture, and the device further comprises:

a second linkage element coupling the first arm to the second arm and defining a second-linkage-element first aperture and a second-linkage-element second aperture, the second linkage element including:

a second-linkage-element/first-arm mating portion extending from an arm-side surface of the second linkage element to the second-linkage-element first aperture and including a second-linkage-element/first-arm mating portion cross-sectional profile that changes along a length of the second-linkage-element/first-arm mating portion in a direction toward the second-linkage-element first aperture in a manner complementary to the first-arm/second-linkage-element mating portion cross-sectional profile such that the second-linkage-element/first-arm mating portion mates with the first-arm/second-linkage-element mating portion, a second-linkage-element/second-arm mating portion extending from the arm-side surface of the second linkage element to the second-linkage-element second aperture and including a second-linkage-element/second-arm mating portion cross-sectional profile that changes along a length of the second-linkage-element/second-arm mating portion in a direction toward the second-linkage-element second aperture in a manner complementary to the second-arm/second-linkage-element mating portion cross-sectional profile such that the second-linkage-element/second-arm mates with the second-arm/second-linkage-element mating portion, a third linkage element coupling the first arm to the second arm and defining a third-linkage-element first aperture and a third-linkage-element second aperture, the third linkage element including:

a third-linkage-element/first-arm mating portion extending from an arm-side surface of the third linkage element to the third-linkage-element first aperture and including a third-linkage-element/first-arm mating portion cross-sectional profile that changes along a length of the third-linkage-element/first-arm mating portion in a direction toward the third-linkage-element first aperture in a manner complementary to the first-arm/third-linkage-element mating portion cross-sectional profile such that the third-linkage-element/first-arm mating portion mates with the first-arm/third-linkage-element mating portion, a third-linkage-element/second-arm mating portion extending from the arm-side surface of the third linkage element to the third-linkage-element second aperture and including a third-linkage-element/second-arm mating portion cross-sectional profile that changes along a length of the third-linkage-element/second-arm mating portion in a direction toward the third-linkage-element second aperture in a manner complementary to the second-arm/third-linkage-element mating portion cross-sectional profile such that the third-linkage-element/second-arm mates with the second-arm/third-linkage-element mating portion, a third fastener extending through the second-linkage-element first aperture, the second-linkage-element/first-arm mating portion, the first-arm/second-linkage-element mating portion, the first-arm second aperture, the first-arm/third-linkage-element mating portion, the third- linkage-element/first-arm mating portion, and the third-linkage-element first aperture, and a fourth fastener extending through the second-linkage-element second aperture, the second-linkage-element/second-arm mating portion, the second-arm/second-linkage-element mating portion, the second-arm second aperture, the second-arm/third-linkage-element mating portion, the third-linkage-element/second-arm mating portion, and the third-linkage-element second aperture.

16. The device of claim 15, wherein:

the first fastener does not contact the base first aperture, the base/first-arm mating portion, the first-arm/base mating portion, the first-arm first aperture, the first-arm/first-linkage-element mating portion, the first-linkage-element/first-arm mating portion, or the first-linkage-element first aperture, the second fastener does not contact the base second aperture, the base/second-arm mating portion, the second-arm/base mating portion, the second-arm first aperture, the second-arm/first-linkage-element mating portion, the first-linkage-element/second-arm mating portion, or the first-linkage-element second aperture, the third fastener does not contact the second-linkage-element first aperture, the second-linkage-element/first-arm mating portion, the first-arm/second-linkage-element mating portion, the first-arm second aperture, the first-arm/third-linkage-element mating portion, the third-linkage-element/first-arm mating portion, or the third-linkage-element first aperture, and the fourth fastener does not contact the second-linkage-element second aperture, the second-linkage-element/second-arm mating portion, the second-arm/second-linkage-element mating portion, the second-arm second aperture, the second-arm/third-linkage-element mating portion, the third-linkage-element/second-arm mating portion, or the third-linkage-element second aperture.

17. The device of claim 1, wherein the mounting clamp defines a first clamp opening and a second clamp opening that is spaced from the first clamp opening, wherein the first clamp opening is configured to couple to the wheeled device, and wherein the base is received at the second clamp opening.

18. The device of claim 1, wherein the first arm defines a first receptacle and a second receptacle spaced along the first arm from the first receptacle, wherein the foot is coupled to the first arm at the first receptacle, and wherein the second receptacle is configured to receive the foot to allow a location of the foot on the first arm to be selectively moved from the first receptacle to the second receptacle.

19. The device of claim 1, wherein the actuator comprises a handle, and wherein the handle is removable from the second arm while keeping the base/second-arm mating portion mated with the second-arm/base mating portion.

20. A wheel lock device comprising:

a mounting clamp configured to couple to a wheeled device;

a base extending from the mounting clamp;

a first arm supported by the base, wherein the first arm defines a first receptacle and a second receptacle spaced along the first arm from the first receptacle;

a second arm supported by the base, wherein the base couples the first arm to the second arm;

a first fastener extending between the base and the first arm;

a second fastener extending between the base and the second arm;

a foot coupled to the first arm, wherein the foot is coupled to the first arm at the first receptacle, and wherein the second receptacle is configured to receive the foot to allow a location of the foot on the first arm to be selectively moved from the first receptacle to the second receptacle; and an actuator coupled to the second arm, the actuator configured to move between an engaged position, in which the foot is configured to engage a wheel of the wheeled device, and a disengaged position, in which the foot is configured to disengage the wheel of the wheeled device.

21. The device of claim 20, wherein:

the base includes a base/first-arm mating portion and a base/second-arm mating portion, the first arm includes a first-arm/base mating portion that mates with the base/first-arm mating portion, the second arm includes a second-arm/base mating portion that mates with the base/second-arm mating portion, one of the base/first-arm mating portion and the first-arm/base mating portion comprises a first male conical mating portion and the other of the base/first-arm mating portion and the first-arm/base mating portion comprises a first female conical mating portion, and one of the base/second-arm mating portion and the second-arm/base mating portion comprises a second male conical mating portion and the other of the base/second-arm mating portion and the second-arm/base mating portion comprises a second female conical mating portion.

22. A wheel lock device comprising:

a mounting clamp configured to couple to a wheeled device;

a base extending from the mounting clamp, the base including a base/first-arm mating portion and a base/second-arm mating portion;

a first arm supported by the base, the first arm including a first-arm/base mating portion that mates with the base/first-arm mating portion;

a second arm supported by the base, wherein the base couples the first arm to the second arm, the second arm including a second-arm/base mating portion that mates with the base/second-arm mating portion;

a first fastener extending between the base and the first arm;

a second fastener extending between the base and the second arm;

a foot coupled to the first arm; and a handle coupled to the second arm, wherein the handle is removable from the second arm while keeping the second arm coupled to the first arm via the base, the handle configured to move between an engaged position, in which the foot is configured to engage a wheel of the wheeled device, and a disengaged position, in which the foot is configured to disengage the wheel of the wheeled device, wherein:

one of the base/first-arm mating portion and the first-arm/base mating portion comprises a first male conical mating portion and the other of the base/first-arm mating portion and the first-arm/base mating portion comprises a first female conical mating portion, and one of the base/second-arm mating portion and the second-arm/base mating portion comprises a second male conical mating portion and the other of the base/second-arm mating portion and the second-arm/base mating portion comprises a second female conical mating portion.

* * * * *